US009646145B2

(12) United States Patent
Vida et al.

(10) Patent No.: US 9,646,145 B2
(45) Date of Patent: May 9, 2017

(54) METHOD AND SYSTEM FOR DYNAMICALLY ASSIGNABLE USER INTERFACE

(71) Applicant: SYNACOR INC., Buffalo, NY (US)

(72) Inventors: Gabor Vida, Ottawa (CA); Stephen Mackenzie, Ottawa (CA)

(73) Assignee: Synacor Inc., Buffalo, NY (US)

( * ) Notice: Subject to any disclaimer, the term of this patent is extended or adjusted under 35 U.S.C. 154(b) by 0 days.

(21) Appl. No.: 14/371,072

(22) PCT Filed: Jan. 8, 2013

(86) PCT No.: PCT/CA2013/000004
§ 371 (c)(1),
(2) Date: Jul. 8, 2014

(87) PCT Pub. No.: WO2013/102267
PCT Pub. Date: Jul. 11, 2013

(65) Prior Publication Data
US 2015/0020191 A1 Jan. 15, 2015

Related U.S. Application Data

(60) Provisional application No. 61/584,288, filed on Jan. 8, 2012.

(51) Int. Cl.
*G06F 21/32* (2013.01)
*G06F 21/44* (2013.01)
*G06F 9/44* (2006.01)

(52) U.S. Cl.
CPC ........... *G06F 21/32* (2013.01); *G06F 9/4443* (2013.01); *G06F 21/44* (2013.01); *G06F 2221/2149* (2013.01)

(58) Field of Classification Search
None
See application file for complete search history.

(56) References Cited

U.S. PATENT DOCUMENTS 6,563,430 B1 * 5/2003 Kemink ........... H04N 21/42202
340/12.22
6,633,315 B1 * 10/2003 Sobeski ............... G06F 9/4443
715/762

(Continued)

FOREIGN PATENT DOCUMENTS

WO WO 2009012319 A2 * 1/2009 ......... G06F 3/04817

*Primary Examiner* — Kaveh Abrishamkar
(74) *Attorney, Agent, or Firm* — Rosenberg, Klein & Lee

(57) ABSTRACT

With their ubiquitous nature and perceived personalized character portable electronic devices are increasingly forming part of individual's life as applications exist for practically anything today and new ones are released daily. It is therefore increasingly important for these electronic devices to dynamically adapt applications, information, user interface etc. According to embodiments of the invention user interfaces provide: Biometric Recognition—the user interface (UI) configuration discretely or in combination with other context factors varies according to the identity of the recognized user; Electronic Environment Context—the electronic environment to the electronic device provides contextual basis for the UI; Dynamic Context Adjustment?, and Micro-Contexts —the UI configuration UI adapts as macro- and micro-contexts change with macro-contexts divided into multiple micro-contexts; Intuitive User Interface—user motions are more intuitive and more closely resemble real world actions; and Smart Agent—application notifications are parsed for impact to other actions/activities in other applications.

18 Claims, 25 Drawing Sheets

(56) References Cited

U.S. PATENT DOCUMENTS

| | | | |
|---|---|---|---|
| 6,748,195 B1* | 6/2004 | Phillips | H04M 1/72569 370/338 |
| 7,954,064 B2* | 5/2011 | Forstall | G06F 3/04817 715/765 |
| 2003/0046401 A1* | 3/2003 | Abbott | G06F 9/4443 709/228 |
| 2003/0182394 A1* | 9/2003 | Ryngler | G06Q 10/10 709/217 |
| 2005/0054381 A1* | 3/2005 | Lee | G06F 3/011 455/557 |
| 2005/0283532 A1* | 12/2005 | Kim | H04L 12/2803 709/225 |
| 2006/0015387 A1* | 1/2006 | Moore | G06Q 10/10 707/600 |
| 2006/0107219 A1* | 5/2006 | Ahya | G06F 9/465 715/745 |
| 2006/0270421 A1* | 11/2006 | Phillips | G08B 21/0236 455/457 |
| 2007/0073870 A1* | 3/2007 | Park | G06F 3/0219 709/224 |
| 2007/0101279 A1* | 5/2007 | Chaudhri | G06F 3/0481 715/762 |
| 2007/0101297 A1* | 5/2007 | Forstall | G06F 3/04817 715/841 |
| 2008/0189360 A1* | 8/2008 | Kiley | G06F 17/30867 709/203 |
| 2008/0201649 A1* | 8/2008 | Mattila | G06F 3/04817 715/763 |
| 2009/0024944 A1* | 1/2009 | Louch | G06F 3/04817 715/765 |
| 2009/0063972 A1* | 3/2009 | Ma | G06F 3/048 715/716 |
| 2011/0034129 A1* | 2/2011 | Kim | G06F 1/1626 455/41.3 |
| 2011/0066951 A1* | 3/2011 | Ward-Karet | H04L 43/0894 715/744 |
| 2011/0072492 A1* | 3/2011 | Mohler | G06F 3/04817 726/3 |
| 2012/0208564 A1* | 8/2012 | Clark | G06F 17/3087 455/456.3 |
| 2014/0237589 A1* | 8/2014 | Suggs | G06F 3/005 726/19 |

* cited by examiner

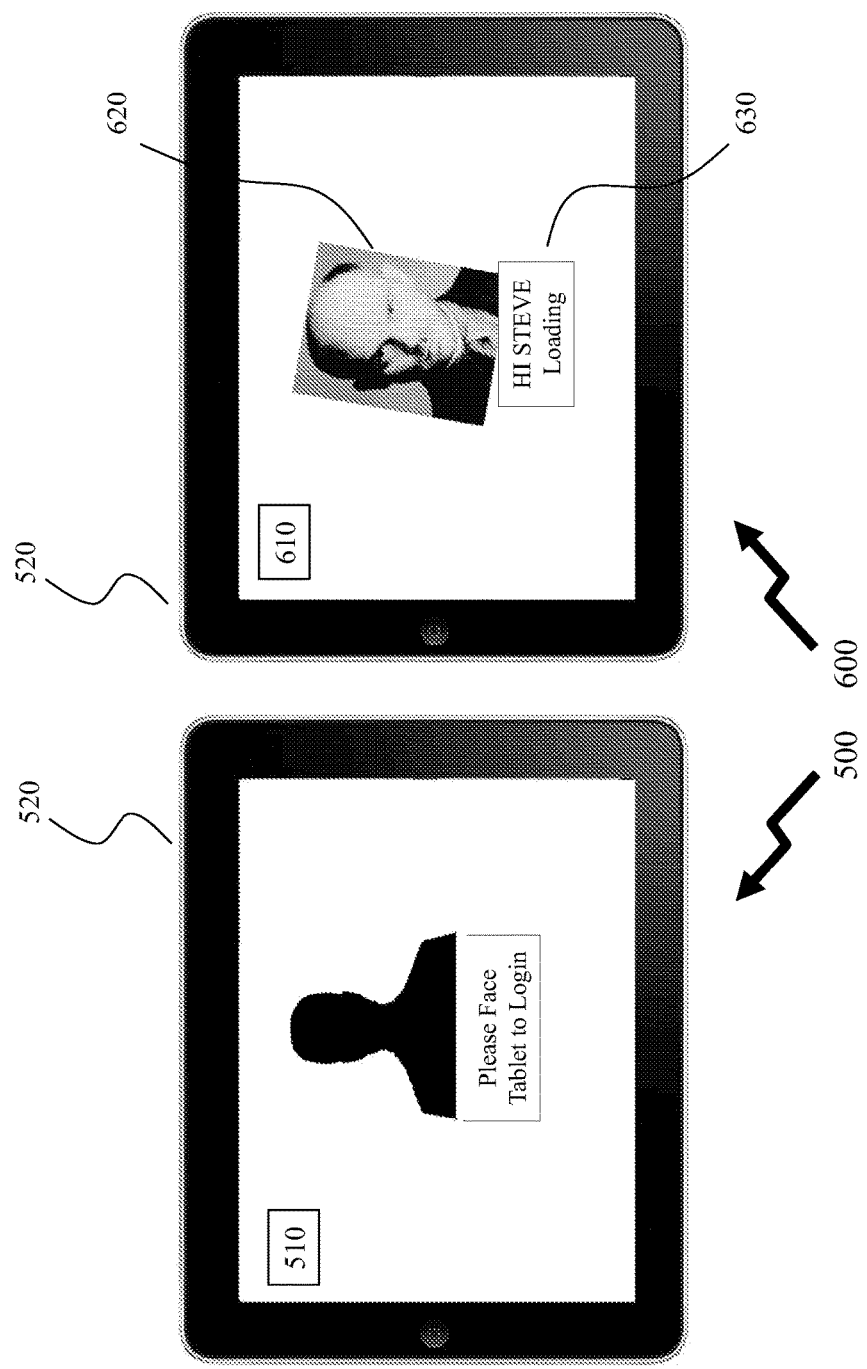

METHOD AND SYSTEM FOR DYNAMICALLY ASSIGNABLE USER INTERFACE

FIELD OF THE INVENTION

The present invention relates to the user interfaces and in particular to methods and systems for establishing dynamically assignable user interfaces.

BACKGROUND OF THE INVENTION

A user interface, in the industrial design field of human-machine interaction, is the "space" where interaction between humans and machines occurs. The goal of interaction between a human and a machine at the user interface is effective operation and control of the machine, and feedback from the machine to the user which aids the user in making operational decisions. Examples of this broad concept of user interfaces include the interactive aspects of computer operating systems, hand tools, heavy machinery operator controls, and process controls. The design considerations applicable when creating user interfaces are related to or involve such disciplines as ergonomics and psychology.

Accordingly a user interface is the system by which people (users) interact with a machine (device) and includes hardware (physical) and software (logical) components. User interfaces exist for a wide variety of systems, and provide a means of:

Input—allowing the users to manipulate a system; and
Output—allowing the system to indicate the effects of the users' manipulation.

Generally, the goal of human-machine interaction engineering is to produce a user interface which makes it easy, efficient, and enjoyable to operate a machine in the way which produces the desired result. This generally means that the operator needs to provide minimal input to achieve the desired output, that the machine minimizes undesired outputs to the human, and that the inputs provided by the operator are intuitive and logical. With the increased use of microprocessor based systems and the relative decline in societal awareness of heavy machinery, the term user interface has taken on overtones of the graphical user interface for electronic devices and systems, whilst industrial control panels and machinery control design discussions more commonly refer to human-machine interfaces. Other common terms for user interface include human-computer interface (HCI) and man-machine interface (MMI).

User interfaces are considered by some authors to be a prime ingredient of Computer user satisfaction. This arises as the design of a user interface affects the amount of effort the user must expend to provide input for the system and to interpret the output of the system, and how much effort it takes to learn how to do this. Usability is the degree to which the design of a particular user interface takes into account the human psychology and physiology of the users, and makes the process of using the system effective, efficient and satisfying.

Usability is mainly a characteristic of the user interface, but is also associated with the functionalities of the product and the process to design it. It describes how well a product can be used for its intended purpose by its target users with efficiency, effectiveness, and satisfaction, also taking into account the requirements from its context of use. In computer science and human-computer interaction, the user interface (of a computer program and/or electronic device) refers to the graphical, textual and auditory information presented to the user, and the control sequences (such as keystrokes with a computer keyboard or touchpad, movements of a computer mouse or finger on a touchpad, and other selections with one or more interfaces to the computer program and/or electronic device that the user employs to control the program Direct manipulation interfaces refers to a general class of user interfaces that allows users to manipulate objects presented to them, using actions that correspond at least loosely to the physical world. However, to date the prior art solutions are confusingly referred to as direct machine interfaces as the user directly selects a feature or an item through an action with a keyboard, touchpad or other input device. However, a point-and-click or touch operation by a user to select an item for movement does not correspond to the physical world where the user would normally pick the item through a pinching or gripping motion with their hand.

Currently the following types of user interface are the most common, graphical user interfaces (GUI) and web-based user interfaces (WUI, also known as web user interfaces). A GUI accepts user input via devices such as keyboard, mouse, and touchpad and provide articulated graphical input/output on the device's display. There are at least two different principles widely used in GUI design, object-oriented user interfaces (OOUIs) and application oriented interfaces (AOIs). Implementations may utilize one or more languages including, but not limited to, and be designed to operate with one or more operating systems, including but not limited to, Symbian, OpenIndiana, Haiku, Android, Windows, Mac OS, iOS, RISC OS, GNU/Linux, Tablet OS, and Blackberry OS as appropriate for portable electronic devices (PEDs) and for fixed electronic devices (FEDs).

A WUI accepts input and provide output by generating web pages which are transmitted via the Internet and viewed by the user using a web browser program. Implementations may utilize Java, AJAX, Adobe Flex, Microsoft .NET, or similar technologies to provide real-time control in a separate program, eliminating the need to refresh a traditional HTML based web browser. Administrative web interfaces for web-servers, servers and networked computers are often called control panels.

Originally user interfaces employed command line interfaces, where the user provided the input by typing a command string with the computer keyboard and the system provided output by printing text on the computer monitor. In many instances such interfaces are still used by programmers and system administrators, in engineering and scientific environments, and by technically advanced personal computer users. These were then augmented in the past with the introduction of controls (also known as widgets) including but not limited to windows, text boxes, buttons, hyperlinks, drop-down lists, tabs, and pop-up menu which may be augmented by Interaction elements are interface objects that represent the state of an ongoing operation or transformation, either as visual remainders of the user intent (such as the pointer), or as affordances showing places where the user may interact including, but not limited to, cursors, pointers and adjustment handles.

Today user interfaces have evolved to include:
Attentive user interfaces manage the user attention deciding when to interrupt the user, the kind of warnings, and the level of detail of the messages presented to the user.
Batch interfaces are non-interactive user interfaces, where the user specifies all the details of the batch job in advance to batch processing, and receives the output when all the processing is done.

Conversational Interface Agents attempt to personify the computer interface in the form of an animated person, robot, or other character and present interactions in a conversational form.

Crossing-based interfaces are graphical user interfaces in which the primary task consists in crossing boundaries instead of pointing.

Gesture interfaces are graphical user interfaces which accept input in a form of hand gestures, or mouse gestures sketched with a computer mouse or a stylus.

Intelligent user interfaces are human-machine interfaces that aim to improve the efficiency, effectiveness, and naturalness of human-machine interaction by representing, reasoning, and acting on models of the user, domain, task, discourse, and media (e.g., graphics, natural language, gesture).

Motion tracking interfaces monitor the user's body motions and translate them into commands.

Multi-screen interfaces, which employ multiple displays to provide a more flexible interaction and is often employed in computer game interactions.

Non-command user interfaces, which observe the user to infer his/her needs and intentions, without requiring that he/she formulate explicit commands.

Object-oriented user interfaces (OOUI) are based on object-oriented programming metaphors, allowing users to manipulate simulated objects and their properties.

Reflexive user interfaces where the users control and redefine the entire system via the user interface alone, for instance to change its command verbs.

Tangible user interfaces, which place a greater emphasis on touch and physical environment or its element.

Task-Focused Interfaces are user interfaces which address the information overload problem of the desktop metaphor by making tasks, not files, the primary unit of interaction Text user interfaces are user interfaces which output text, but accept other form of input in addition to or in place of typed command strings.

Voice user interfaces, which accept input and provide output by generating voice prompts. The user input is made by pressing keys or buttons, or responding verbally to the interface.

Natural-Language interfaces—Used for search engines and on webpages. User types in a question and waits for a response.

Zero-Input interfaces get inputs from a set of sensors instead of querying the user with input dialogs.

Zooming user interfaces are graphical user interfaces in which information objects are represented at different levels of scale and detail, and where the user can change the scale of the viewed area in order to show more detail.

However, despite the evolution of these multiple types of user interface these all treat the environment of the user upon the portable or fixed electronic device as a stable environment and do not fundamentally adjust the user interface or other aspects of the environment including the features and applications available based upon the user as an individual but rather assume all users engage an application in the same manner.

A property of a good user interface is consistency and providing the user with a consistent set of expectations, and then meeting those expectations. Consistency can be bad if not used for a purpose and when it serves no benefit for the end user, though; like any other principle, consistency has its limits. Consistency is one quality traded off in user interface design as described by the cognitive dimensions framework. In some cases, a violation of consistency principles can provide sufficiently clear advantages that a wise and careful user interface designer may choose to violate consistency to achieve some other important goal.

There are generally three aspects identified as relevant to consistency. First, the controls for different features should be presented in a consistent manner so that users can find the controls easily. For example, users find it difficult to use software when some commands are available through menus, some through icons, some through right-clicks, some under a separate button at one corner of a screen, some grouped by function, some grouped by "common," some grouped by "advanced." A user looking for a command should have a consistent search strategy for finding it. The more search strategies a user has to use, the more frustrating the search will be. The more consistent the grouping, the easier the search. The principle of monotony of design in user interfaces states that ideally there should be only way to achieve a simple operation, to facilitate habituation to the interface.

Second, there is the principle of astonishment in that various features should work in similar ways and hence an interface should not in one embodiment or situation require the user to "select feature, then select function to apply" and then in other situations "select function, and then select feature to apply. Commands should work the same way in all contexts. Third, consistency counsels against user interface changes version-to-version. Change should be minimized, and forward-compatibility should be maintained which adjusts as devices and interfaces mature. Traditionally, less mature applications and hardware had fewer users who were entrenched in any status quo and older, more broadly used applications and hardware had to carefully hew to the status quo to avoid disruptive costs and user backlash. However, today a new application and/or hardware element which is successful within the consumer field will evolve from nothing to millions of users within a very short period of time. For example, the Apple iPad™ was released April 2010 and sold 3 million units within the first 80 days. In the eight months of 2010 these sales totaled 14.8 million and in late 2011 Apple was widely believed to be on track to sell 40 million devices that year.

The design of user interfaces widely exploit mental models, which are generally founded on difficult to quantify, obscure, or incomplete facts, flexible which is considerably variable in positive as well as in negative sense, act as an information filter which cause selective perception (i.e. perception of only selected parts of information) and in many instances are limited when compared with the complexities surrounding the world. For example, the recently released Samsung Galaxy™ smartphone uses facial recognition to unlock the smartphone for a single user but does not perform any additional functionality as all protection is lost by simply giving the unlocked smartphone to another user.

Mental models are a fundamental way to understand organizational learning and in many instances are based upon deeply held images of thinking and acting. Mental models are so basic to understanding of the world that people are hardly conscious of them and are generally expressed in a couple of basic forms including:

Polygons—where vertices sharing an edge represent related items;

Causal-loop diagrams—which display tendency and a direction of information connections and the resulting causality; and Flow diagrams—which are used to express a dynamic system.

Accordingly, a users whilst unaware of the mental models employed anticipate users interfaces, software, and hardware to behave in particular ways and going against entrenched mental models will result in users feeling one or more of confused, ignored, and dissatisfied. Today social media mean that these users can rapidly express their opinions to a wide audience and negatively impact the commercial success of the software and/or hardware.

With the widespread penetration of portable electronic devices to consumers today a smartphone must support intuitive interfaces, provide rapid switching between applications allowing a user to browse, text, view, play, comment, etc through direct email, web based email, simple message service (SMS), telephony, multimedia applications, downloaded and online gaming, social media services, streamed multimedia content, etc. At the same time these portable electronic devices include multiple wireless interfaces, including but not limited to IEEE 802.11, IEEE 802.15, IEEE 802.16, IEEE 802.20, UMTS, GSM 850, GSM 900, GSM 1800, GSM 1900, and GPRS as well as one or more of Near Field Communication (NFC) interfaces, accelerometers, global positioning systems (GPS), and compass so that the devices are location aware and third party applications utilizing this information are increasing such as Google's Latitude, Apple's Find My Friends, and Singles Around Me.

With their ubiquitous nature and perceived personalized character smartphones are increasingly being targeted for other aspects of an individuals life such as purchasing with MasterCard's PayPass program or Visa's payWave, banking with applications from institutions such as Bank of America, Chase, PayPal, Wells Fargo, Capital One, American Express, and insurance with applications from State Farm etc as well as medical, news, lifestyle, health and fitness, and education. Accordingly, portable electronic devices such as a cellular telephone, smartphone, personal digital assistant (PDA), portable computer, pager, portable multimedia player, portable gaming console, laptop computer, tablet computer, and an electronic reader contain confidential and sensitive information relating to the user.

It is therefore increasingly beneficial for these electronic devices to adapt the applications, information, user interface etc presented to a user based upon the identity of the user. But additionally it would be beneficial for these aspects to be adjusted based upon the context of the user's use of the electronic device. Such principles, however, also apply to non-portable electronic devices such as Internet enable televisions, gaming systems, and desktop computers.

Accordingly user interfaces and electronic devices according to embodiments of the invention beneficially provide biometric recognition, environmental context, and dynamic reconfiguration with changing context, intuitive interfaces, and micro-contexts.

Biometric Recognition—wherein the user interface (UI) configuration discretely or in combination with other context factors varies according to the identity of the recognized user. Such contextual user based UI configuration for example including selection of one of a plurality of UIs for presentation to the user, adaptation of UI/dashboard elements, and adaptation of applications accessible and their settings.

Electronic Environment Context—wherein the electronic environment to the electronic device provides contextual basis for the user activities so that UI, dashboard, applications, settings, etc may be varied in dependence upon this wireless/wired environment.

Dynamic Context Adjustment—wherein the configuration of UI, dashboard, applications, settings, etc adapts as the context changes either discretely or continuously based upon the environment of the user electronically, geographically, temporally and/or people.

Micro-Contexts—wherein macro-contexts such home, travel, and work for example are actually multiple contexts that result in more subtle adjustments to the UI, dashboard, applications, settings, etc.

Intuitive User Interface—wherein motions made by the user which are more intuitive such as pinching, picking, opening, closing etc. are made through predetermined motions on a touchscreen which more closely resemble those made by a user in the real world.

Other aspects and features of the present invention will become apparent to those ordinarily skilled in the art upon review of the following description of specific embodiments of the invention in conjunction with the accompanying figures.

SUMMARY OF THE INVENTION

It is an object of the present invention to mitigate limitations in the prior art relating to user interfaces and in particular to methods and systems for establishing dynamically assignable user interfaces.

In accordance with an embodiment of the invention there is provided a method comprising:
providing a sensor for registering a biometric characteristic of a user;
providing a microprocessor executing a user interface application relating to a user interface for the device;
providing a memory for storing:
the user interface application,
at least one reference biometric characteristic of a plurality of reference biometric characteristics, each reference biometric characteristic relating to an authorised user of the device;
at least one contextual dashboard of a plurality of contextual dashboards; and
at least one user profile of a plurality of user profiles, each user profile associated with a predetermined portion of the plurality of contextual dashboards and each contextual dashboard relates to configurations for a predetermined set of software applications to be provided to a predetermined user;
providing at least one wireless interface of a plurality of wireless interfaces, each wireless interface operating according to a predetermined standard;
executing with the microprocessor the user interface application to verify an intended user of the device as an authorised user and provide a contextual dashboard for display, the contextual dashboard selected in dependence upon at least the authorised user, a macro-context of the electronic device and a micro-context of the electronic device.

In accordance with an embodiment of the invention there is provided a method comprising:
providing a user interface application in execution upon a device comprising at least a memory and a microprocessor;
providing a plurality of contextual dashboards within the memory, each contextual dashboard relating to the identities and settings of a predetermined set of software applications;

establishing a first contextual dashboard upon a display in dependence upon the user interface application, an identity of a user of the device, a macro-context, and a micro-context;

detecting a change in at least one of the user identity, the macro-context and the micro-context;

dynamically modifying the first contextual dashboard to a second contextual dashboard, the second contextual dashboard being determined in dependence upon the user interface application, the changed at least one of the user identity, the macro-context and the micro-context and the unchanged at least ones of the user identity, the macro-context and the micro-context.

In accordance with an embodiment of the invention there is provided a method comprising:

providing an application in execution upon a device comprising at least a memory, a touchpad and a microprocessor;

detecting a predetermined motion of the user's fingers on the touchpad in association with an object displayed to the user;

associating the predetermined motion of the user's fingers to an action relating to the object displayed to the user;

displaying to the user the result of applying the action relating to the object to the object.

In accordance with an embodiment of the invention there is provided a method comprising:

executing upon a first computer comprising a microprocessor a smart agent application;

parsing communications at least one of to and from a first software application of a plurality of software applications with the smart agent application for instances of communications containing data relating to an item of information within the first software application;

determining with the smart agent an impact of the data to the item of information; and determining a proposed modification to the item of information in dependence upon at the least the data.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

Embodiments of the present invention will now be described, by way of example only, with reference to the attached Figures, wherein:

FIG. 5 depicts an exemplary lock screen presented to a user according to an embodiment of the invention;

FIG. 6 depicts an exemplary user access screen presented to a user according to an embodiment of the invention;

DETAILED DESCRIPTION

Figure 1:
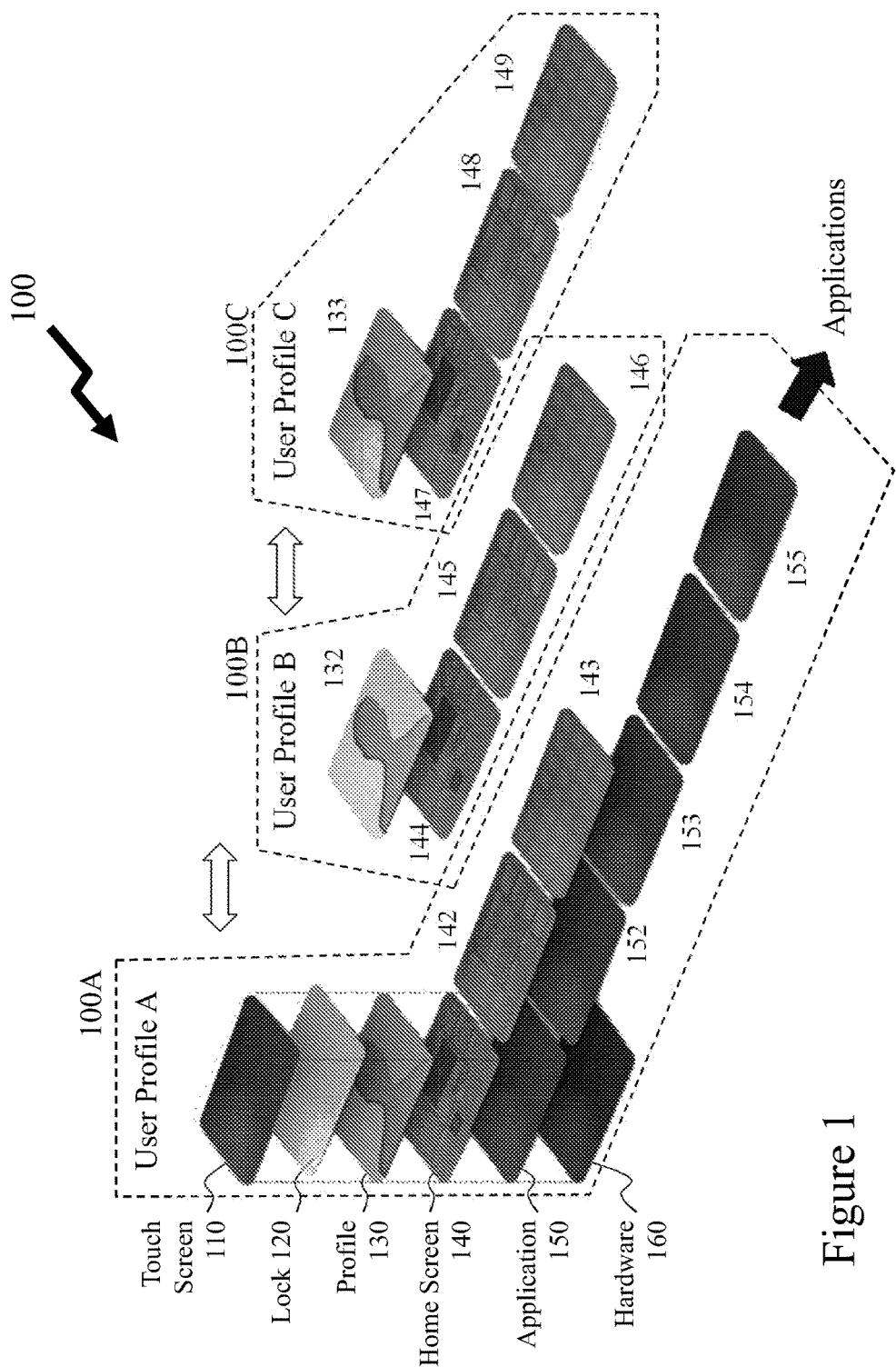
FIG. 1 depicts a contextual UI mental model according to an embodiment of the invention.

The present invention is directed to user interfaces and in particular to methods and systems for establishing dynamically assignable user interfaces.

The ensuing description provides exemplary embodiment(s) only, and is not intended to limit the scope, applicability or configuration of the disclosure. Rather, the ensuing description of the exemplary embodiment(s) will provide those skilled in the art with an enabling description for implementing an exemplary embodiment. It being understood that various changes may be made in the function and arrangement of elements without departing from the spirit and scope as set forth in the appended claims.

A "portable electronic device" as used herein and throughout this disclosure, refers to a wireless device used for communication that requires a battery or other independent form of energy for power. This includes devices, but is not limited to, such as a cellular telephone, smartphone, personal digital assistant (PDA), portable computer, pager, portable multimedia player, portable gaming console, laptop computer, tablet computer, and an electronic reader. A "fixed electronic device" (FED) as used herein and throughout this disclosure, refers to a wireless device or wired device used for communication that does not require a battery or other independent form of energy for power. This includes devices, but is not limited to, Internet enable televisions, gaming systems, desktop computers, kiosks, and Internet enabled communications terminals.

A "network operator" or "network service provider" as used herein may refer to, but is not limited to, a telephone or other company that provides services for mobile phone subscribers including voice, text, and Internet; telephone or other company that provides services for subscribers including but not limited to voice, text, Voice-over-IP, and Internet; a telephone, cable or other company that provides wireless access to local area, metropolitan area, and long-haul networks for data, text, Internet, and other traffic or communication sessions; etc.

A "software system" as used as used herein may refer to, but is not limited to, a server based computer system executing a software application or software suite of applications to provide one or more features relating to the licensing, annotating, publishing, generating, rendering, encrypting, social community engagement, storing, merging, and rendering electronic content and tracking of user and social community activities of electronic content. The software system being accessed through communications from a "software application" or "software applications" and providing data including, but not limited to, electronic content to the software application. A "software application" as used as used herein may refer to, but is not limited to, an application, combination of applications, or application suite in execution upon a portable electronic device or fixed electronic device to provide one or more features relating to one or more features relating to generating, rendering, managing and controlling a user interface. The software application in its various forms may form part of the operating system, be part of an application layer, or be an additional layer between the operating system and application layer.

A "user" as used herein and through this disclosure refers to, but is not limited to, a person or device that utilizes the software system and/or software application and as used herein may refer to a person, group, or organization that has registered with the software system and/or software application to acquire primary content and generates secondary content in association with the primary content. A "user interface" as used herein and through this disclosure refers to, but is not limited to a graphical user interface (GUI) and/or web-based user interface (WUI) which accepts user input from one or more user input devices and provides output to the user. Typically the user interface will provide articulated graphical input/output on a display and/or screen of an electronic device but may also provide articulated graphical output in conjunction with audio and/or tactile output as well as accepting input through audio, visual, and haptic interfaces.

Referring to FIG. 1 there is depicted a contextual UI mental model 100 according to an embodiment of the invention. Within the contextual UI mental model 100 first to third user profiles 100A through 100C are depicted for Users A, B, and C respectively. Considering first user profile 100A then this comprises a plurality of layers denoted as Touch Screen 110, Lock 120, Profile 130, Contextual dashboard 140, Application 150 and Hardware 160 wherein the contextual UI mental model 100 is implemented upon a portable electronic device such as a smartphone, tablet PC, and PDA wherein Touch Screen 110 provides the primary user input through the touch sensitive surface and the primary user output through the LCD/LED display. Accordingly, a user accessing Touch Screen 110 is presented with Lock 120 which according to embodiments of the invention provides biometric registration of the user through a process such as presented below in respect of FIGS. 5, 6, 7 and 21.

Accordingly, the software application for a user providing valid biometric registration credentials determines which user profile of a plurality of user profiles to present to the user. Within this contextual UI mental model 100 the selection therefore is from User Profile A 100A, User Profile B 100B, and User Profile C 100C. If the selection was User Profile A 100A, relating to a first user A, then the user is presented with a contextual dashboard in dependence upon the context of the user at that point in time and their User A Profile 130, being thereby selected from first to third contextual dashboards 140, 142 and 143 respectively. Each of the first to third contextual dashboards 140, 142 and 143 respectively displays a predetermined combination of applications based upon one or more of the characteristics of the selected contextual dashboard, the settings from a previous session, and data retrieved relating to the displayed applications. These applications being selected from first to fifth applications 150 and 152 to 155 respectively.

Where the contextual UI mental model 100 establishes that the user is a second user, User B, then the selected user profile is User Profile B 100B. The presented contextual dashboard selected in dependence upon the context of the user at that point in time and their User B Profile 132, being thereby selected from fourth to sixth contextual dashboards 144 to 146 respectively. Each of the fourth to sixth contextual dashboards 144 to 146 respectively displays a predetermined combination of applications based upon one or more of the characteristics of the selected contextual dashboard, the settings from a previous session, and data retrieved relating to the displayed applications. These applications not displayed for clarity but may include one or more of the first to fifth applications 150 and 152 to 155 respectively as well as others.

If the contextual UI mental model 100 establishes that the user is a third user, User C, then the selected user profile is User Profile C 100C. The presented contextual dashboard selected in dependence upon the context of the user at that point in time and their User Profile C 133 being selected from seventh to ninth contextual dashboards 147 to 149 respectively. Each of the seventh to ninth contextual dashboards 147 to 149 respectively displays a predetermined combination of applications based upon one or more of the characteristics of the selected contextual dashboard, the settings from a previous session, and data retrieved relating to the displayed applications. These applications not displayed for clarity but may include one or more of the first to fifth applications 150 and 152 to 155 respectively as well as others.

It would be evident to one skilled in the art that the Touch Screen 110 may with variations in Hardware 160 be represented alternatively by one or more user input means and one or more user output means. It would also be apparent that according to the configuration and specifications of elements within the Hardware 160 aspects of the operation and performance of other levels may vary. An exemplary configuration for Hardware 160 is presented below in respect of FIG. 23 by Electronic Device 2304.

Figure 2:
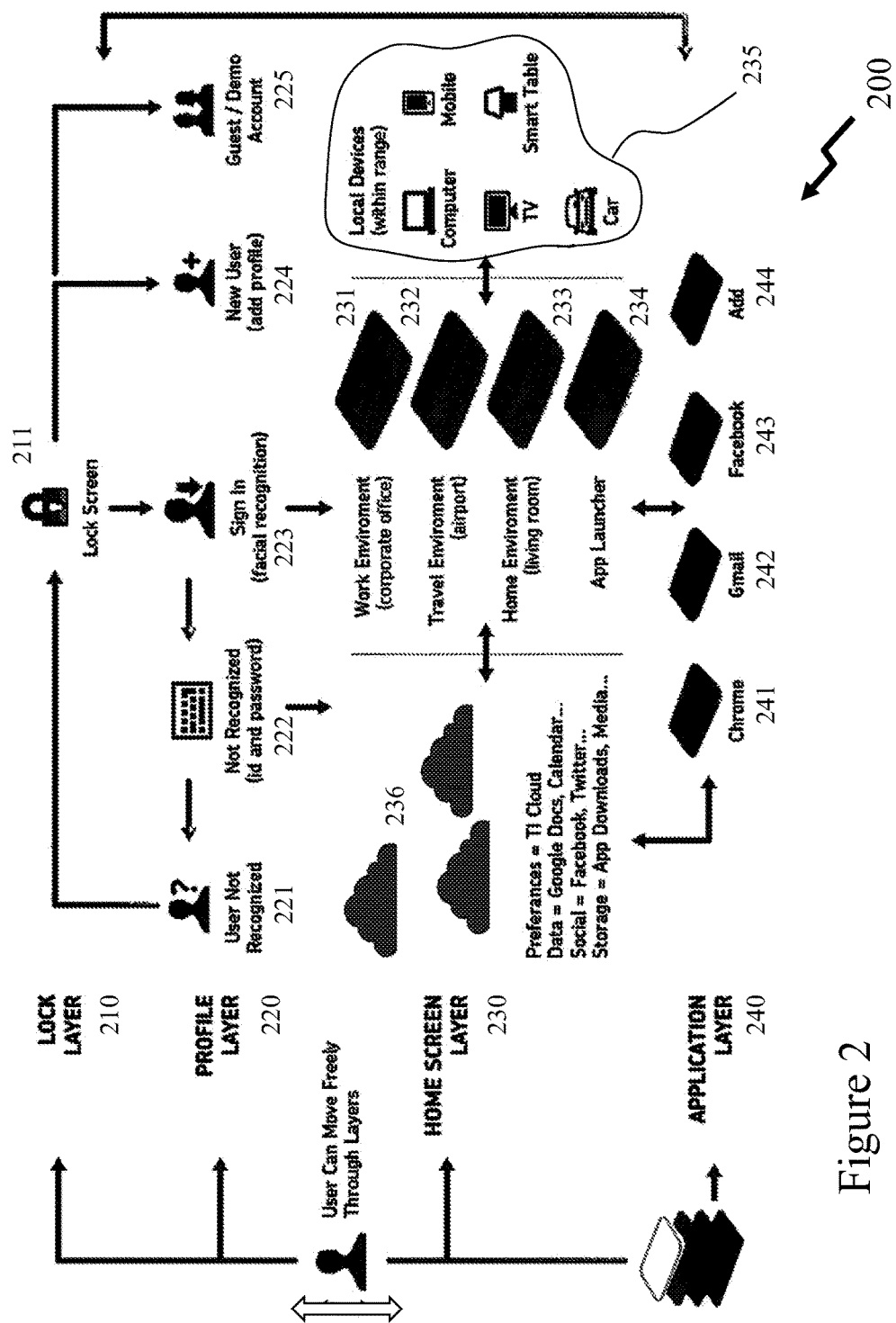
FIG. 2 depicts a contextual UI mental model according to an embodiment of the invention.

Referring to FIG. 2 there is depicted a contextual UI mental model 200 according to an embodiment of the invention. As shown the contextual UI mental model 200 comprises Lock Layer 210, Profile Layer 220, Contextual Dashboard Layer 230, and Application Layer 240. Considering initially Lock Layer 210 then this comprises a Lock Screen 211 that locks the electronic device and requires that a user provide a valid credential or credentials in order to access the Profile Layer 220. Within Profile Layer 220 the contextual UI mental model 200 addresses results of biometric credential provision with Sign In 223 wherein a determination is made as to whether the biometric credential matches an authorised user of the electronic device. If so, the contextual UI mental model 200 proceeds to the Contextual Dashboard Layer 230.

If the biometric credential does not match then the contextual UI mental model 200 move to Not Recognised 222 wherein a user may present mechanically entered credentials through providing an ID and associated password. If these credentials are not correct the contextual UI mental model 200 provides a response to the user in User Not Recognised 221 and returns to the Lock Screen 211. At Lock Screen 211 a registered user may elect to add a further user wherein the contextual UI mental model 200 provides for biometric credential registration for the new user in New User 224. Alternatively the registered user may elect to allow another user to access the electronic device as a temporary user without stored credentials wherein the contextual UI mental model 200 allows for entry through a Guest Account 225.

From either Not Recognised 222 or Sign In 223 the contextual UI mental model 200 proceeds to Contextual Dashboard Layer 230. In the instances of New User 224 and Guest Account 225 default contextual dashboards are presented to the user wherein in the former the new user may start the process of establishing characteristics of the contextual dashboard they desire for that current context. Subsequent access by the new user in different contexts will result over time in establishing additional contextual dashboards where appropriate for the user. Within contextual UI mental model 200 there is no customization of contextual dashboard for a guest entering through Guest Account 225.

In Home Layer 230 the selection of a contextual dashboard is made based upon macro-context data, including for example but not limited to electronic device associations, geographic location, network associations, and date and time. As depicted the contextual dashboards are Work Environment 231, Travel Environment 232, and Home Environment 233 as well as an Application Launcher 234 is triggered to launch the applications which will be displayed within the selected contextual dashboard. Each contextual dashboard may be refined based upon micro-context data, including but not limited to electronic device associations, user input, and date and time. Examples of electronic device associations being depicted by device group 235 which includes a computer, a mobile device, television, smart table, an automobile. The Application Launcher 234 launches applications such as Google Chrome 241, Google Gmail 242 and Facebook 243 as well as an interface for adding new applications, Add 244.

Based upon the macro- and micro-context information together with the selected contextual dashboard and launched application data and/or content is retrieved either from within the electronic device supporting the UI or from one or more networks 236 to which the electronic device is connected. Such retrieved data includes user preferences, e.g. using TI Group's TI Cloud services; data source, e.g. Google Docs and Calendar; Social networks, e.g. Facebook and Twitter; and Storage, e.g. Application Downloads and Media sources. Optionally contextual UI mental model 200 may include additional layers to those depicted including but not limited to operating system, hardware, user attributes, user preferences and user input/output devices.

Figure 3:
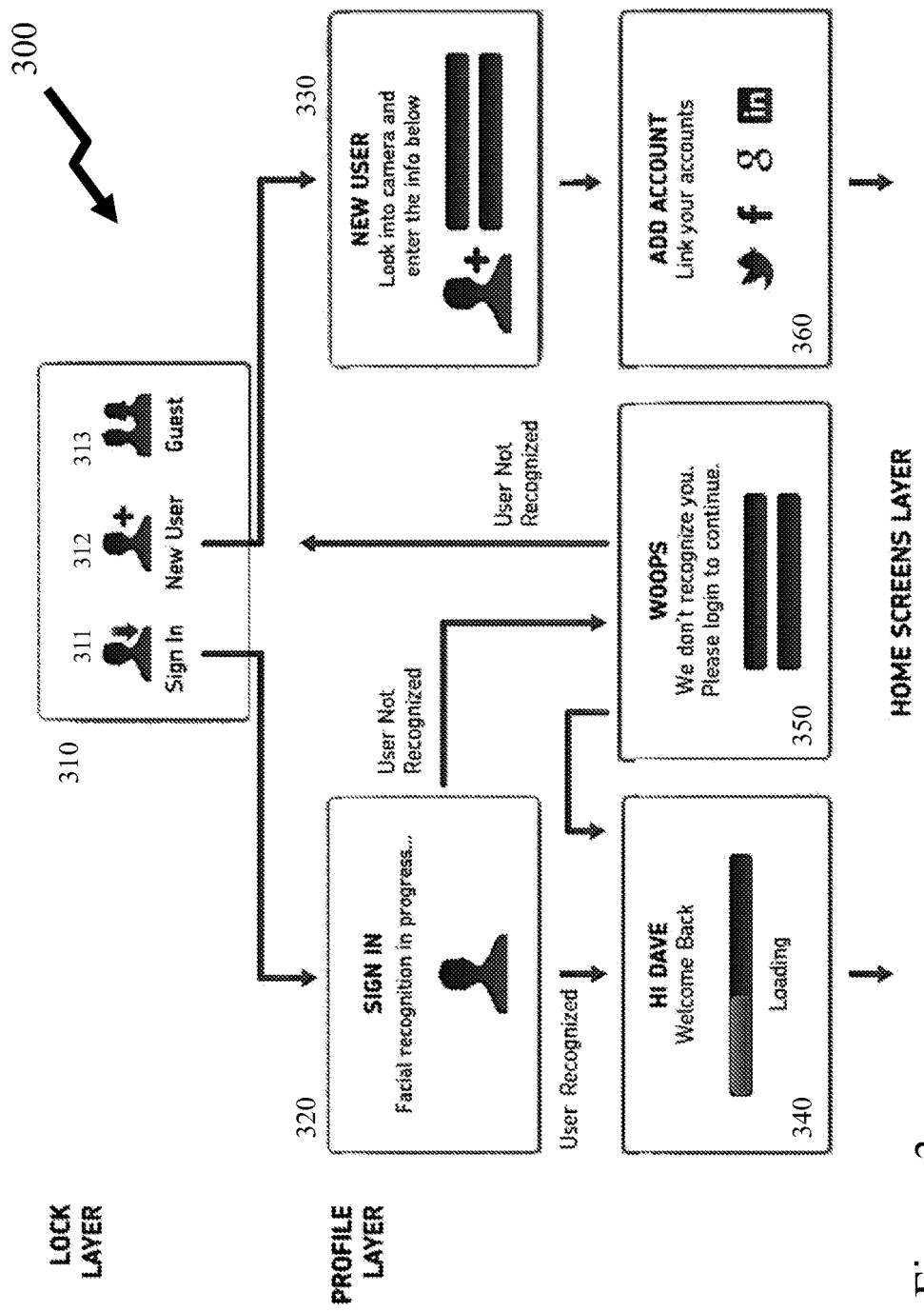
FIG. 3 depicts an exemplary profile layer flow according to an embodiment of the invention.

Now referring to FIG. 3 there is depicted an exemplary profile layer flow 300 according to an embodiment of the invention wherein biometric credential entry is through facial recognition. Accordingly at Lock Layer 310 responses to biometric credential and/or other data entry is determined as Sign In 311, New User 312, and Guest 313. From Sign In 311 the process flow proceeds to Profile Layer with Facial Recognition Sign In 320 wherein the user is either recognized leading to progression to Welcome 340 or not recognised leading to Woops 350 wherein alternate credential entry is provided to the user. For example, the user may be in different lighting conditions, wearing clothing partially obscuring their face, etc. which causes the facial recognition process to fail even for an authorised user. Successful entry of the alternate credentials in Woops 350 leads to Welcome 340 otherwise the flow returns to Lock Layer 310. From New User 312 the flow proceeds to Face Entry 330 wherein the new user is asked to look into the camera to allow an image to be captured for processing and storage as a new authorised facial credential. From New User 312 the flow proceeds to Add Account 360 wherein the new user is prompted to link predetermined applications within the default contextual dashboard(s) to their personal accounts, such as Twitter™, Facebook™, Gmail™, and LinkedIn™. From Add Account 360 and Welcome 340 the flow proceeds to the Contextual dashboards Layer which is not shown for clarity.

It would be evident to one skilled in the art that facial recognition represents only one potential biometric verification technique available. Any biometric identifier which is a distinctive, measurable characteristic used to differentiate individuals may be employed and are generally categorized as physiological or behavioral characteristics. Physiological characteristics are related to the shape of the body, and include but are not limited to, fingerprint, face recognition, DNA, palm print, hand geometry, iris recognition, retina recognition, DNA, and odour/scent. Behavioral characteristics include but not limited to typing rhythm, gait, and voice. It would be evident to one skilled in the art that the selected biometric characteristic may be selected according to the electronic device, the degree of security protection required, etc. and that in other instances two or more biometric characteristics may be employed.

One potential disadvantage of some biometrics, such as facial recognition which is common due to smartphones and cellular telephones, laptops, tablet computers, etc. including a camera, is that if someone's face is compromised that it cannot be cancelled and re-issued unlike a token or password. Accordingly, embodiments of the invention may employ cancelable biometrics wherein protection is incorporated or replacement features are included. For example cancelable biometrics may perform a distortion of the biometric image or features before matching and it is the variability in the distortion parameters which provides the cancelable nature of the scheme.

Figure 4:
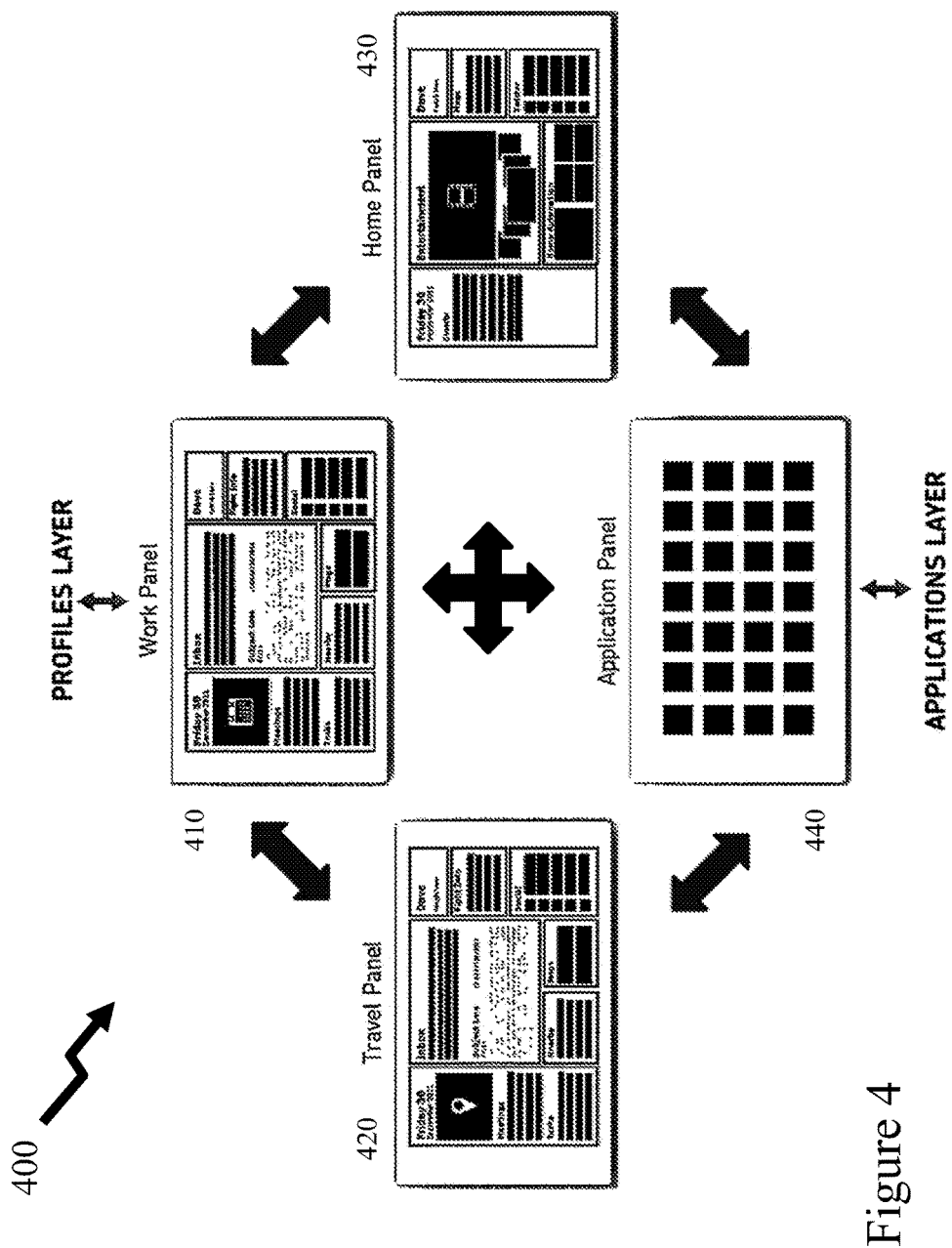
FIG. 4 depicts an exemplary migration of contextual dashboard layers for a user according to an embodiment of the invention.

Referring to FIG. 4 there is depicted an exemplary migration of contextual dashboard layers for a user according to an embodiment of the invention within flow 400. Accordingly, within a Contextual Dashboard Layer of a contextual UI four contextual dashboards are Work Panel 410, Travel Panel 420, Home Panel and Application Panel 440. Migration between any pair of contextual dashboards may be made either through the user ceasing to use the UI and re-accessing the lock screen from a different location or as the result of continued use with migration from one macro-context to another. Likewise the Application Panel 440 may be accessed from any home panel. Optionally, Application Panel 440 may be accessible only from a limited number of macro-context defined home panels.

Alternatively, where a user is accessing one or more applications during the detection of a macro-context and/or micro-context change these applications may be maintained in the initial configuration until a predetermined condition occurs such as stopping the application, inactivity for predetermined period of time, or an override resulting from preferences and/or settings may be invoked.

Referring to FIG. 5 there is depicted an exemplary lock screen 500 presented to a user according to an embodiment of the invention wherein a tablet 520 has a first UI screen 510 indicating that the user should face the tablet 520 to log-in due to the use of facial recognition in conjunction with a camera in the tablet 520, not shown for clarity. Successful facial recognition results in FIG. 6 wherein an exemplary user access screen 600 is presented to the user according to an embodiment of the invention. User access screen 600 presents second UI screen 610 together with an image 620 of the recognised user and a message 630, in this instance "HI STEVE Loading."

Figure 7:
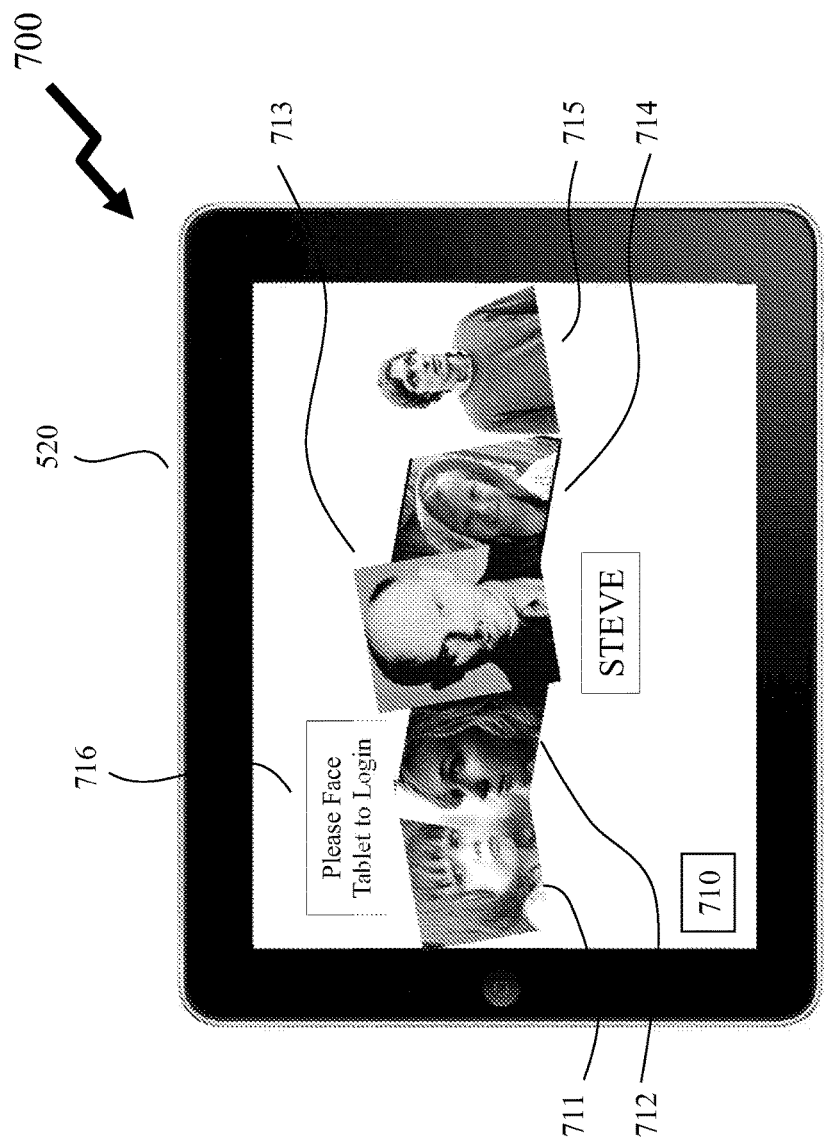
FIG. 7 depicts an exemplary partial user lock screen according to an embodiment of the invention.

Subsequently the UI detects inactivity for a predetermined period of time after a successful user log-in and proceeds to a partial user lock screen 700 as depicted within FIG. 7 according to an embodiment of the invention. Accordingly third UI screen 710 is presented to the user with a message 716, again due to the user of facial recognition within the UI on tablet 520, indicating that the user should face the tablet 520. On the third UI screen are first to fifth images 711 through 715 respectively. Third image 713 is presented centrally and larger, than first, second, fourth and fifth images 711, 712, 714, and 715 respectively due to the fact that it represents the last valid user within the current macro-context/micro-context. The first, second, fourth and fifth images 711, 712, 714, and 715 respectively relate to other users approved to access the electronic device within the current macro-context/micro-context.

Accordingly it would be evident to one skilled in that art that an electronic device may have a biometric verification process therefore wherein the valid user list varies according to the macro-context and/or micro-context. For example, a child may be a valid user for an electronic device in the macro-context of home and micro-context of the playroom within the house but not where the macro-context of the home and micro-context of a bedroom within the house. Equally the user list in a partial user lock screen 700 where the macro-context is work may be different to that for home etc.

Figure 8:
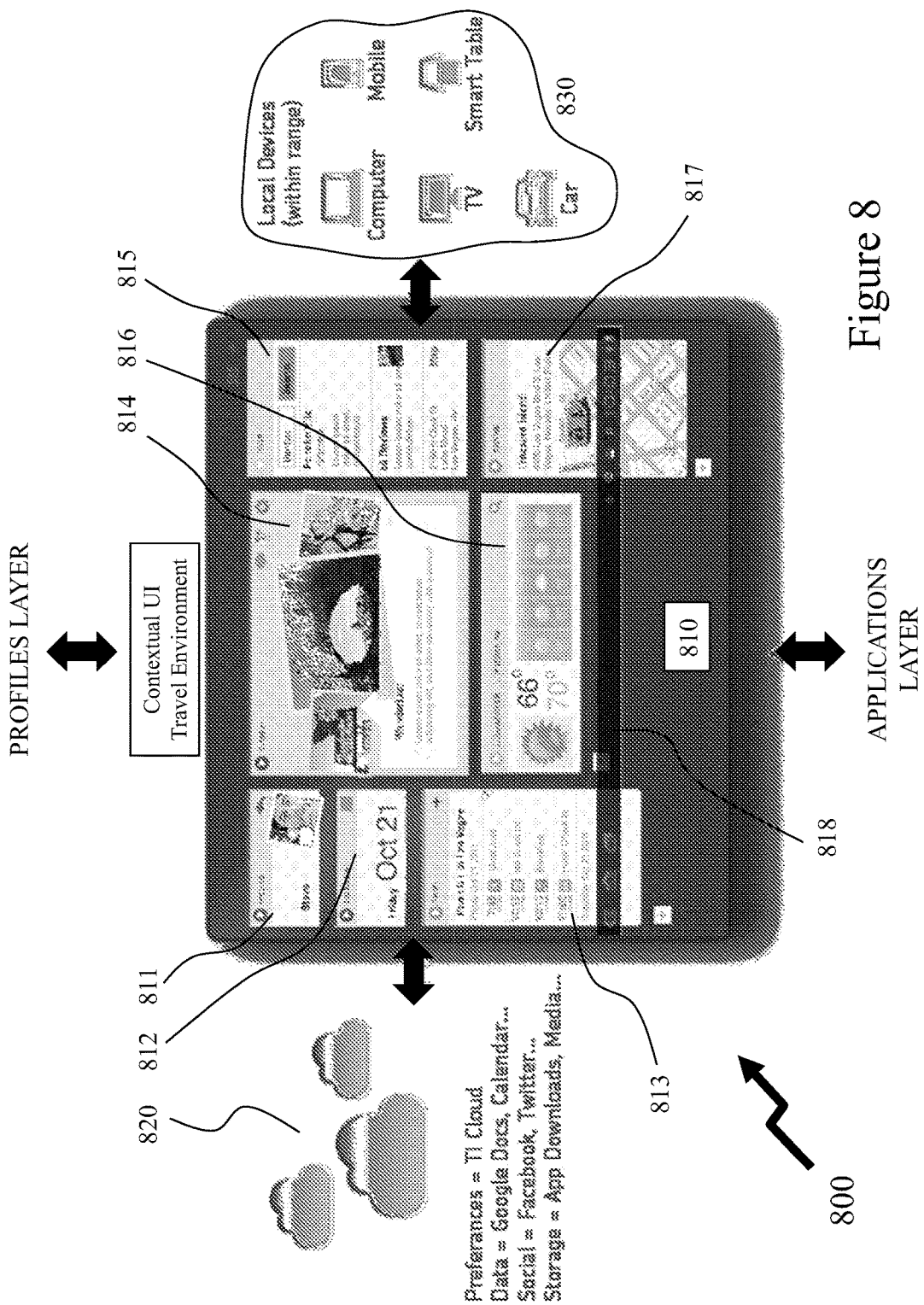
FIG. 8 depicts an exemplary contextual dashboard in travel mode presented to a user according to an embodiment of the invention.

Now referring to FIG. 8 there is depicted an exemplary contextual dashboard 810 for a UI 800 wherein the macro-context is travel as presented to a user according to an embodiment of the invention. Accordingly, contextual dashboard 810 sits between the profiles layer and applications layer of the UI 800 and has been established in dependence upon macro-context, not shown for clarity, and micro-context information 830. Data and content for the applications within contextual dashboard 810 being sourced from the electronic device and/or through remote sources 820 interfaced through one or more networks connected to the electronic device. Depicted within contextual dashboard 810 are applications for Profile 811, Calendar 812, Travel 813, Blog 814, Review 815, Weather 816, Taxi 817 as well as toolbar 818. Travel 813 may for example be TripIt™, Weather 816 AccuWeather, Blog 814 Tumblr™, Review 815 Yelp™ and Taxi 817 Cab4Me™.

Figure 9:
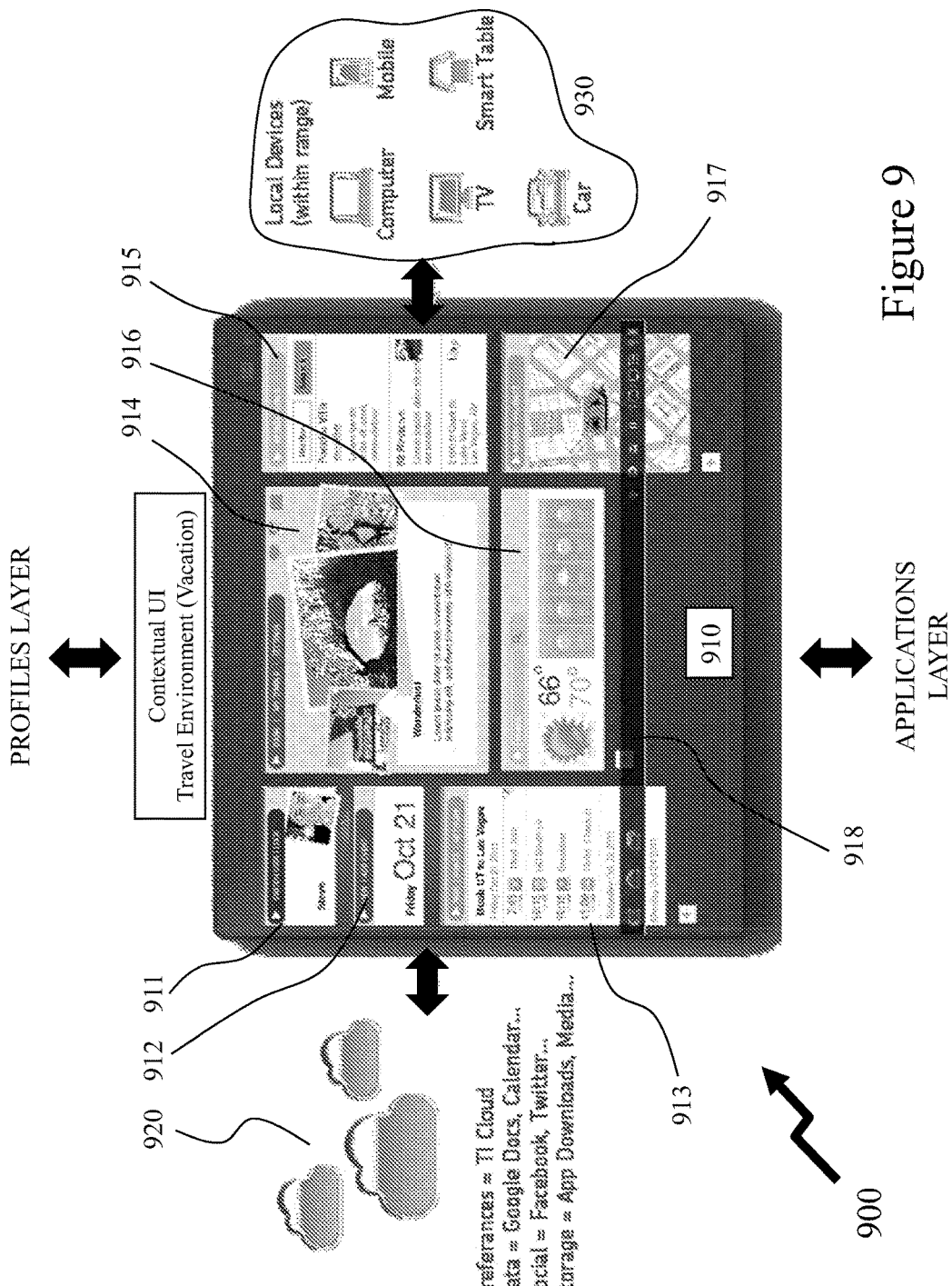
FIG. 9 depicts an exemplary contextual dashboard in travel (vacation) mode presented to a user with application options according to an embodiment of the invention.

Now referring to FIG. 9 there is depicted an exemplary contextual dashboard 910 for a UI 800 wherein the macro-context is travel as presented to a user according to an embodiment of the invention but wherein the context is now one of vacation as opposed to business travel. Accordingly, contextual dashboard 910 sits between the profiles layer and applications layer of the UI 900 and has been established in dependence upon macro-context, not shown for clarity, and micro-context information 930. Data and content for the applications within contextual dashboard 910 being sourced from the electronic device and/or through remote sources 920 interfaced through one or more networks connected to the electronic device. Depicted within contextual dashboard 910 are applications for Profile 911, Calendar 912, Travel 913, Blog 914, Review 915, Weather 916, Taxi 917 as well as toolbar 918. It would be evident to one skilled in the art that the applications displayed within the UI in the travel and travel (vacation) contextual dashboards may be different as well as having different settings/preferences.

Figure 10:
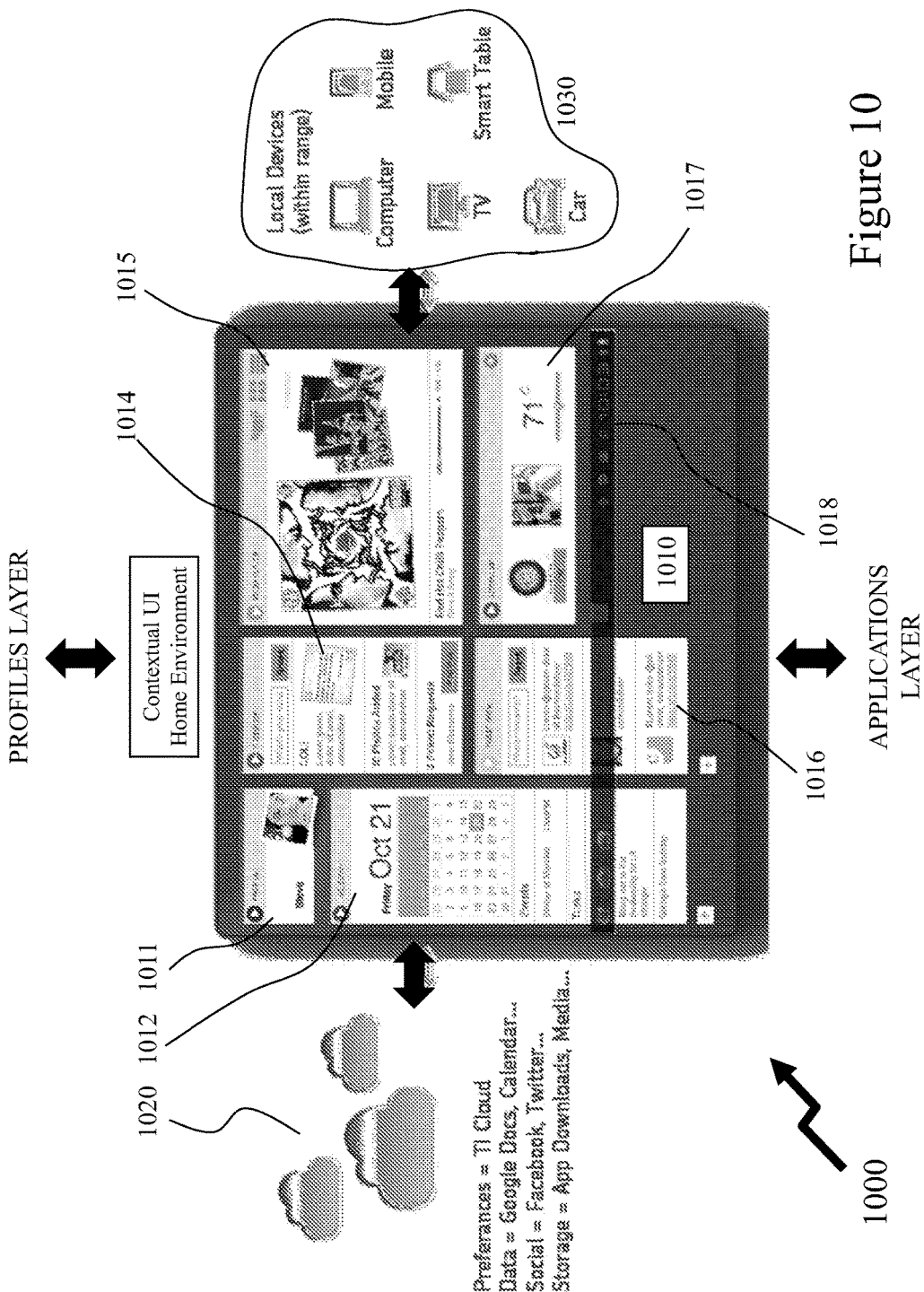
FIG. 10 depicts an exemplary contextual dashboard in home mode presented to a user according to an embodiment of the invention.

Now referring to FIG. 10 there is depicted an exemplary contextual dashboard 1010 for a UI 1000 wherein the macro-context is home as presented to a user according to an embodiment of the invention. Accordingly, contextual dashboard 1010 sits between the profiles layer and applications layer of the UI 1000 and has been established in dependence upon macro-context, not shown for clarity, and micro-context information 1030. Data and content for the applications within contextual dashboard 1010 being sourced from the electronic device and/or through remote sources 1020 interfaced through one or more networks connected to the electronic device. Depicted within contextual dashboard 1010 are applications for Profile 1011, Calendar 1012, First Social Application 1014, Second Social Application Review 1016, Media Player 1015, Security 1017 as well as toolbar 1018. Calendar 1012 for example being Google Calendar, First Social Application 1014 Facebook™, Second Social Application Review 1016 TweetDeck™ and Security 1017 ADT Pulse.

Figure 11:
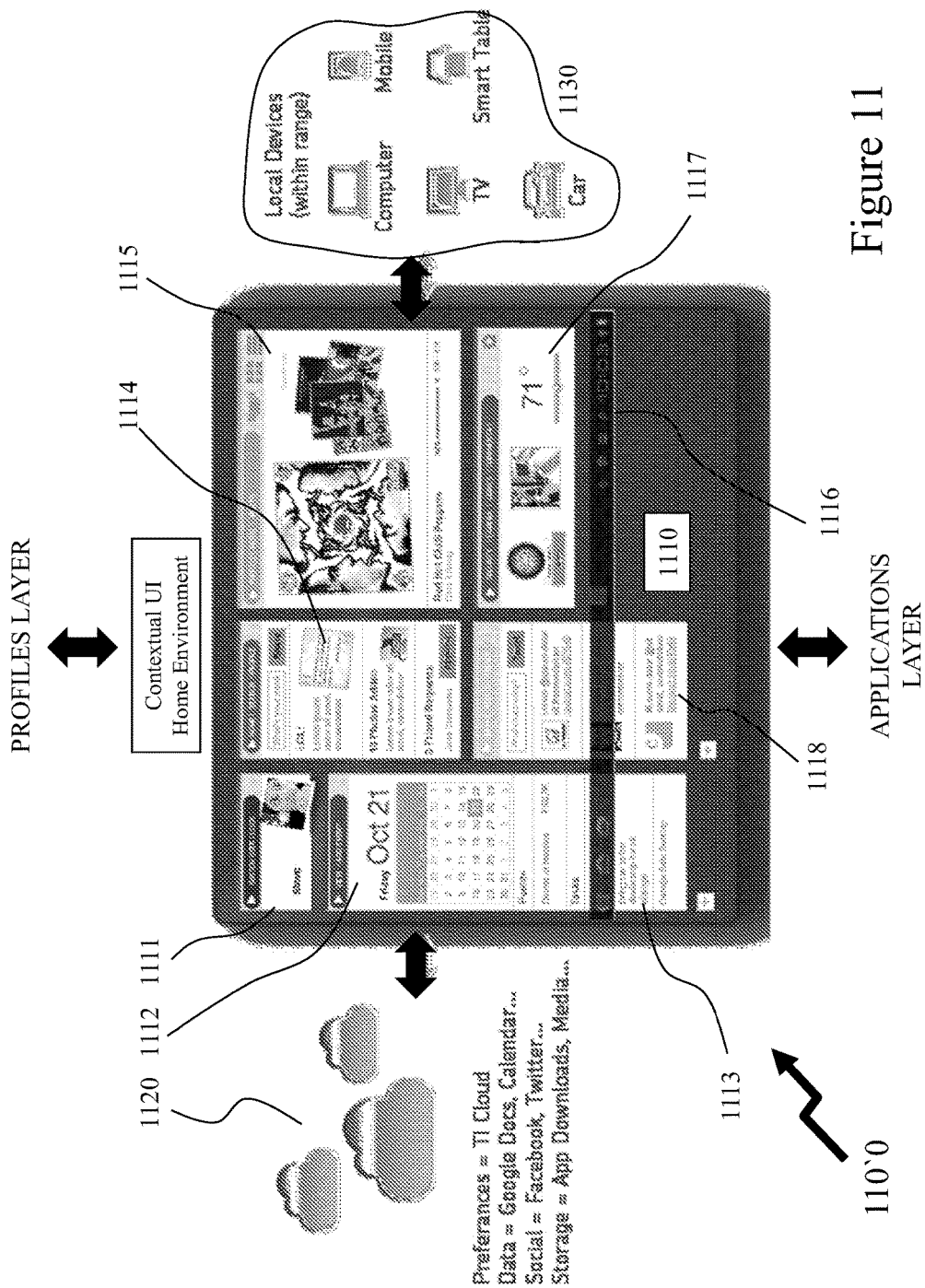
FIG. 11 depicts an exemplary contextual dashboard in home mode with application tasks presented to a user according to an embodiment of the invention.

Now referring to FIG. 11 there is depicted an exemplary contextual dashboard 1110 for a UI 1000 wherein the macro-context is home as presented to a user according to an embodiment of the invention with each application showing task bars such as described below in respect of FIG. 15. Accordingly, contextual dashboard 1110 sits between the profiles layer and applications layer of the UI 1100 and has been established in dependence upon macro-context, not shown for clarity, and micro-context information 1130. Data and content for the applications within contextual dashboard 1110 being sourced from the electronic device and/or through remote sources 1120 interfaced through one or more networks connected to the electronic device. Depicted within contextual dashboard 1110 are applications for Profile 1111, Calendar 1112, First Social Application 1114, Second Social Application Review 1116, Media Player 1115, Security 1117 as well as toolbar 1118. Tasks within the task bars being:

Profile 1101—Switch User, Lock;
Calendar 1112—View, Add Event;
First Social Application 1114—Home, Search, Profile;
Second Social Application Review 1116—On, My Tweets, Friends;
Media Player 1115—Photos, Music, Videos; and
Security 1117—Security, Camera, Lights, Thermostat.

Figure 12:
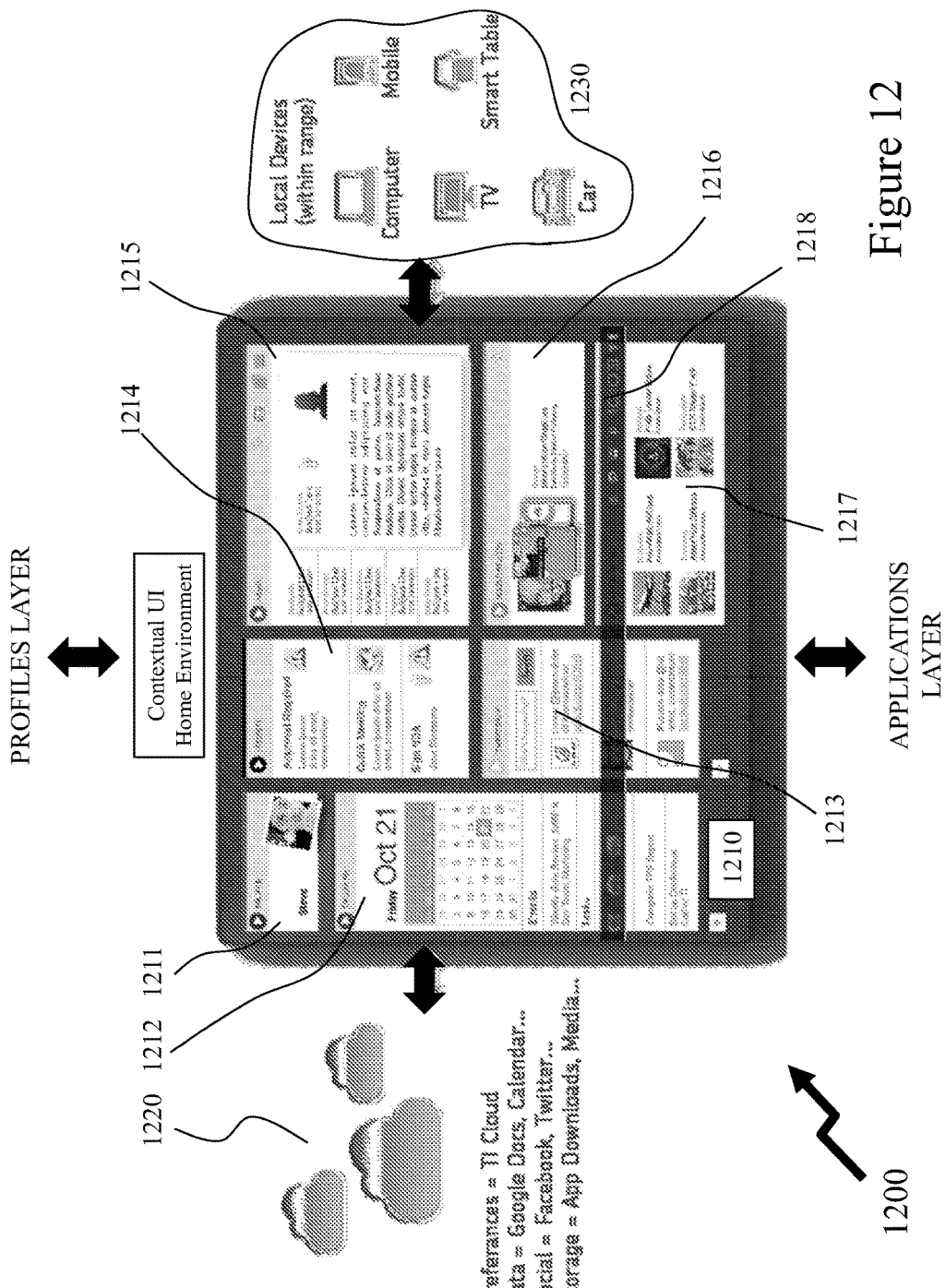
FIG. 12 depicts an exemplary contextual dashboard in work mode presented to a user according to an embodiment of the invention.
Figure 13:
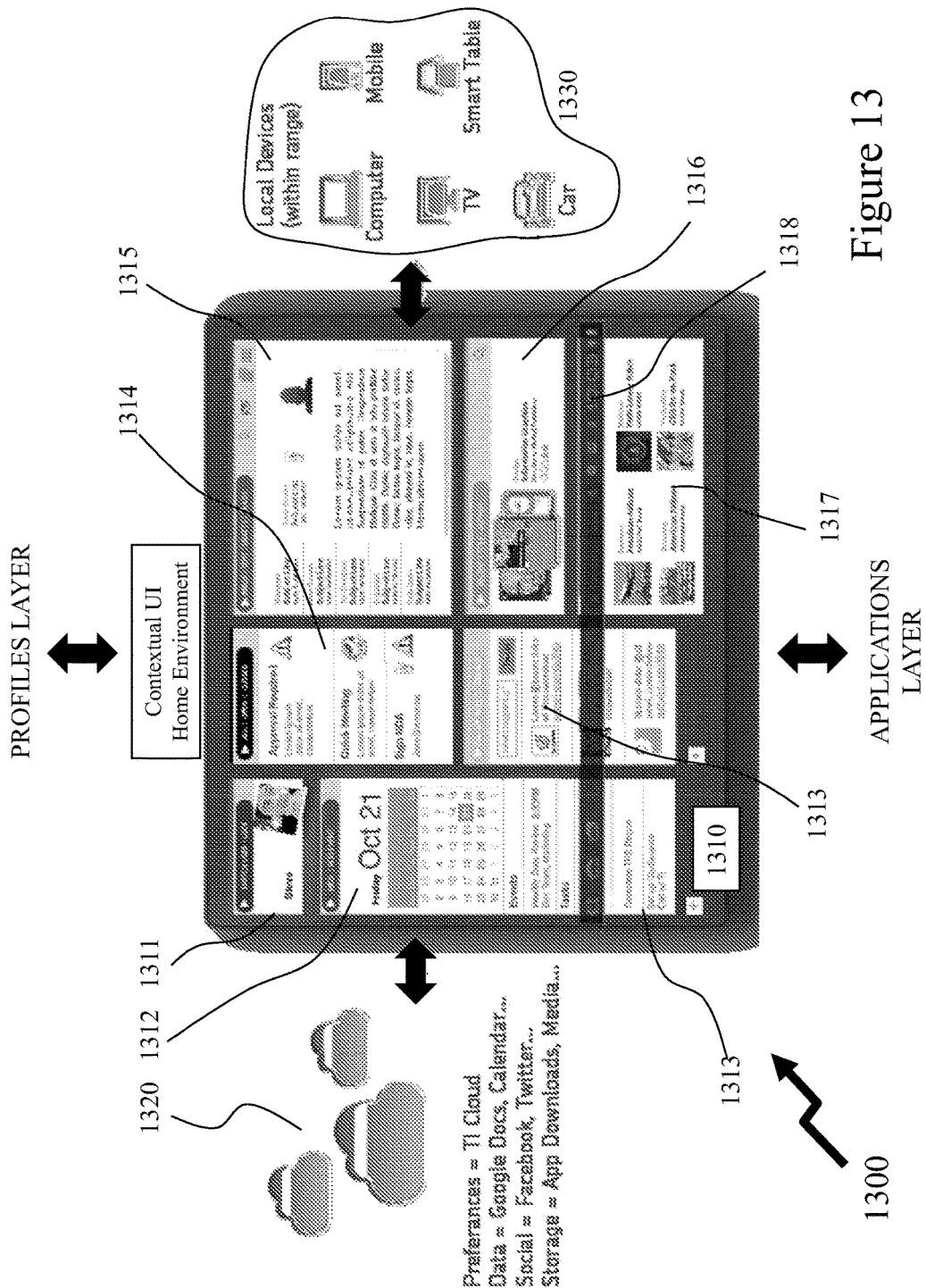
FIG. 13 depicts an exemplary work screen in work mode with application tasks presented to a user according to an embodiment of the invention.

Now referring to FIG. 12 there is depicted an exemplary contextual dashboard 1210 for a UI 1200 wherein the macro-context is work as presented to a user according to an embodiment of the invention. Accordingly, contextual dashboard 1210 sits between the profiles layer and applications layer of the UI 1200 and has been established in dependence upon macro-context, not shown for clarity, and micro-context information 1230. Data and content for the applications within contextual dashboard 1210 being sourced from the electronic device and/or through remote sources 1220 interfaced through one or more networks connected to the electronic device. Depicted within contextual dashboard 1210 are applications for Profile 1211, Calendar 1212, Task List 1214, Social Application 1213, Email 1215, eReader 1216, News 1217 as well as toolbar 1218. Calendar 1212 and Task 1214 for example being Google Calendar and task list within Google Calendar, Social Application 1213 for example being Tweet Deck, Email 1215 for example being Google Gmail, eReader 1216 for example being Kindle™ Reader, and News 1217 being Yahoo™ News.

Now referring to FIG. 12 there is depicted an exemplary contextual dashboard 1310 for a UI 1200 wherein the macro-context is work as presented to a user according to an embodiment of the invention but now applications are shown with task modes active. Accordingly, contextual dashboard 1310 sits between the profiles layer and applications layer of the UI 1300 and has been established in dependence upon macro-context, not shown for clarity, and micro-context information 1330. Data and content for the applications within contextual dashboard 1310 being sourced from the electronic device and/or through remote sources 1320 interfaced through one or more networks connected to the electronic device. Depicted within contextual dashboard 1310 are applications for Profile 1311, Calendar 1312, Task List 1314, Social Application 1313, Email 1315, eReader 1316, News 1317 as well as toolbar 1318. Calendar 1312 and Task 1314 for example being Google Calendar and task list within Google Calendar, Social Application 1313 for example being Tweet Deck, Email 1315 for example being Google Gmail, eReader 1316 for example being Kindle™ Reader, and News 1317 being Yahoo™ News. Tasks within the task bars being:

Profile 1311—Switch User, Lock;
Calendar 1312—View, Add Event;
Social Application 1313—On, My Tweets, Friends;
Task 1314—All, Open, Closed;
Email 1315—Inbox, Set, Drafts, Trash;
eReader 1316—Recent, Title, Author; and
News 1317—Top Stories, Videos.

Figure 14A:
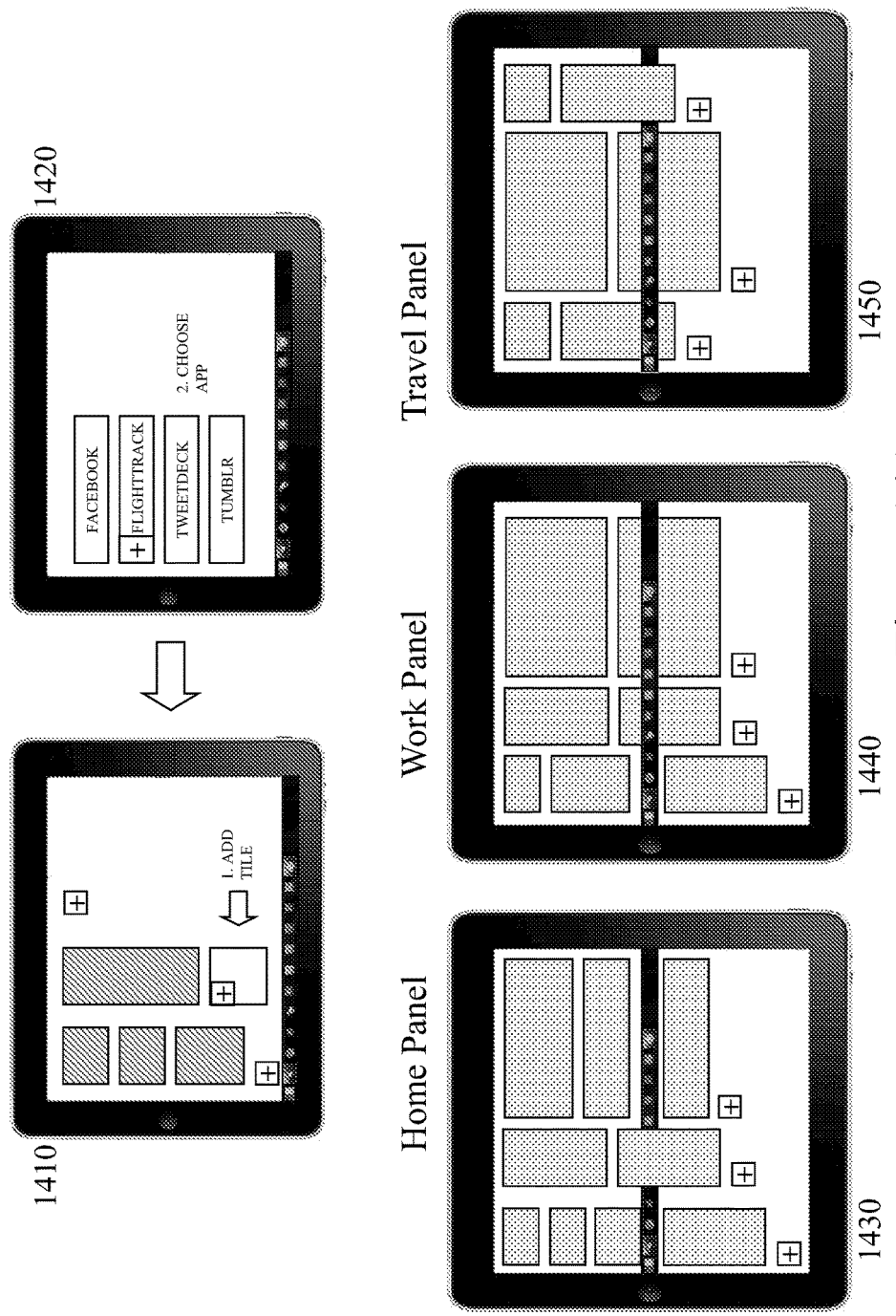
FIG. 14A depicts user dashboard customization according to an embodiment of the invention.

Now referring to FIG. 14 there is depicted user dashboard customization sequence according to an embodiment of the invention. Accordingly in first screen 1410 the UI is depicted with four applications, denoted by hatched areas, and three addition boxes. The UI being defined in first screen as three columns to date with 3 applications in the first column and one application in the second column. If the user moves to one of the addition boxes then an arrow appears with the text "1. Add Title" wherein a selection action from the user results in second screen 1420 wherein a list of applications are presented to the user together with the text "2. Choose App." In this instance the user is presented with Facebook™, FlightTrack, Tweet Deck, and Tumblr wherein motion of the user over FlightTrack has resulted in this being modified to show an addition symbol wherein upon selection the selected application will then be added to the bottom of the second column of the first screen 1410 and the original addition symbol will moved to the bottom of the column.

Also depicted in FIG. 14 are examples of layouts for a user wherein they have configured Home Panel 1430, Work Panel 1440, and Travel Panel 1450. It would be evident to one skilled in the art that a new user may initially be presented with default screens for multiple contextual dashboards or may be presented with a single contextual dashboard and then given the option to establish subsequent contextual dashboards through a user driven process. Optionally, the UI may be monitoring macro- and micro-context information and may derive based upon a pattern of behavior that the user may benefit from the addition of a new screen. For example the UI may note that the user accesses Microsoft Outlook between 10 am and 4 pm weekdays alongside Google Calendar in association with an IEEE 802.11g node identified as "USPTO ABC123" whilst their initially configured contextual dashboard is Google Gmail and Google Calendar in association with an IEEE 802.11b node identified as "RobinsonFamily." Accordingly the UI may prompt the user as to whether they wish to assign a new contextual dashboard, select the contextual dashboard definition (e.g. work, main office etc.) and then store their current application settings as part of that new contextual dashboard.

Figure 14B:
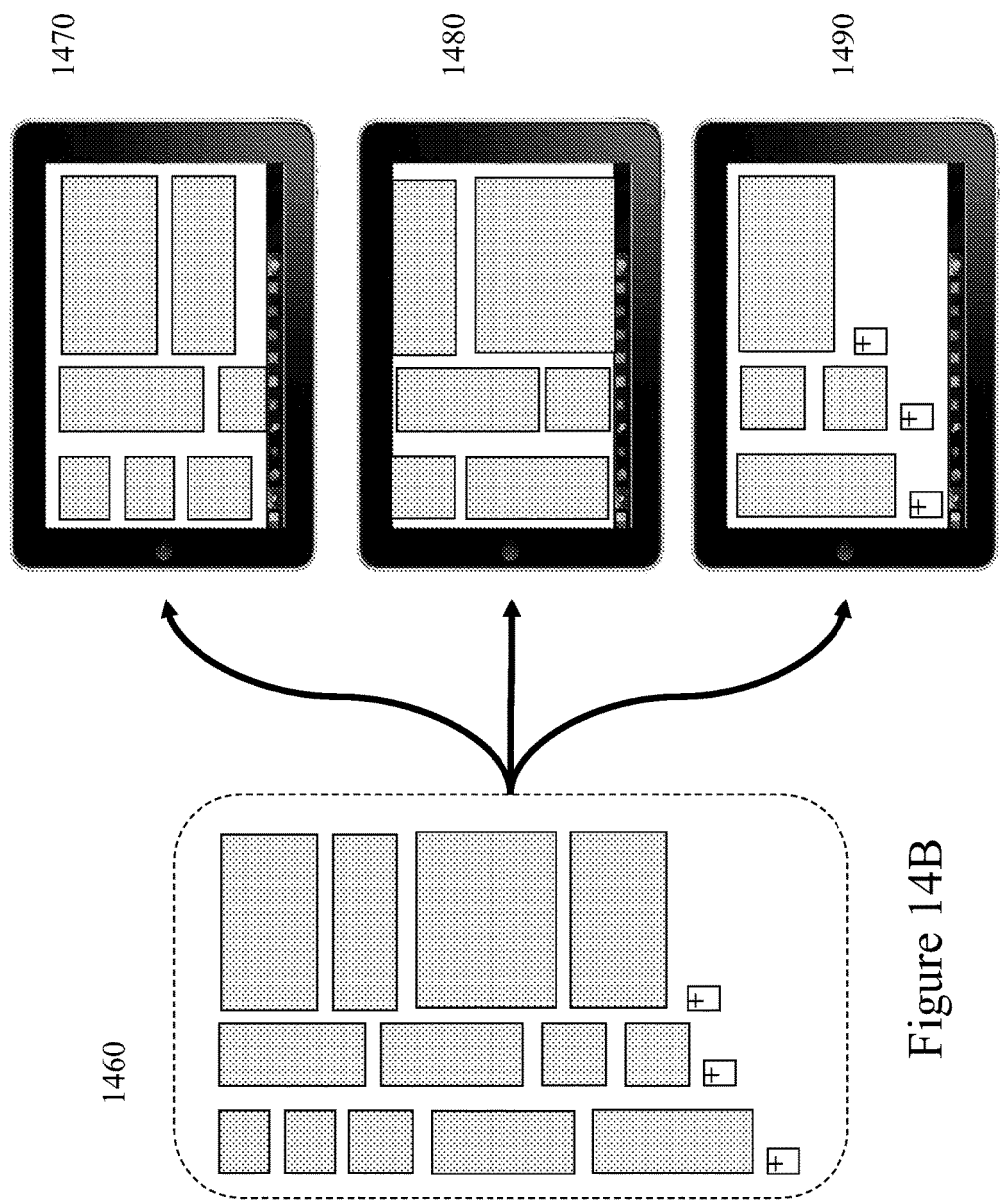
FIG. 14B depicts extended dashboard configuration and dynamic mapping to electronic device.

Now referring to FIG. 14B there is depicted a contextual dashboard 1460 wherein the user has added a large number of applications to the one contextual dashboard. Accordingly in first screen 1470 the user is presented with a top portion of the contextual dashboard 1460 that maps to the electronic device display based upon user preferences, such as for example minimum font size. If the user scrolls down then the display adjusts to present second screen 1480, and then subsequently third screen 1490 as the user keeps scrolling. As displayed within first to third screens 1470 to 1490 respectively the UI manages the application so that these are displayed within the screen as full windows and accordingly the relative position of applications within each of the first to third screens 1470 to 1490 adjusts relative to the mapped application structure in contextual dashboard 1460. Similarly, rotating the screen of the electronic device would result in a different mapping of the contextual dashboard 1460 to displayed screens to the user.

It would be evident that the user may in addition to having home, work, and travel as contextual dashboard options may establish multiple contextual dashboards for work for example to reflect their activities within their office versus those in the boardroom as micro-context driven work contextual dashboard variations. Similarly a user may have multiple contextual dashboards for their home such as office, playroom, living room, bedroom and may optionally also opt to configure multiple contextual dashboards for the same macro- and micro-context. For example, their contextual dashboard for "home" and "office" may be configured to one contextual dashboard during 8 am-6 pm Monday-Friday and configured to another contextual dashboard during other times. In this example the macro- and micro-context now includes overall geographic location, electronic association to define office as opposed to kitchen etc., and time-day to provide multiple contextual dashboards in the same physical location.

Figure 15:
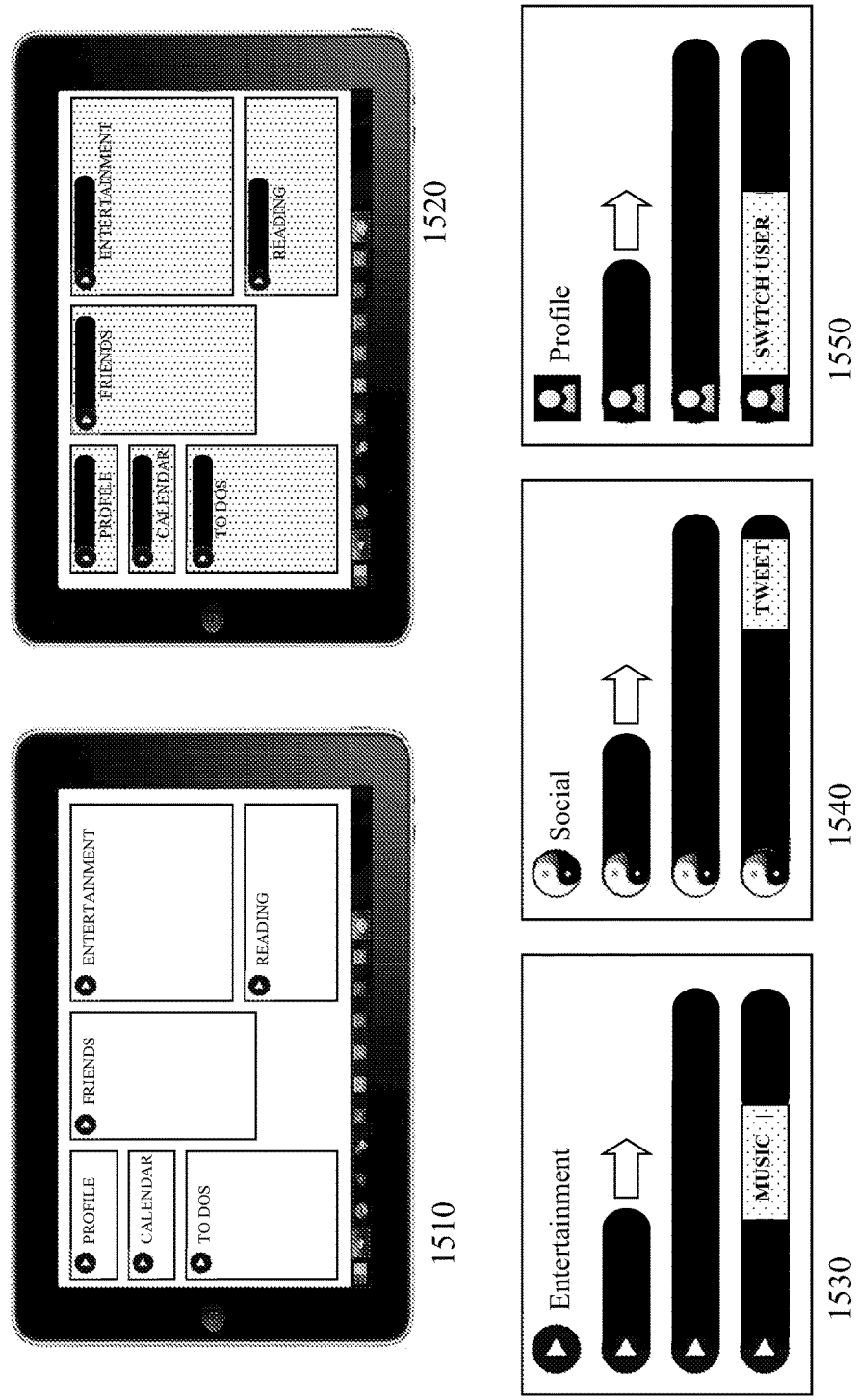
FIG. 15 depicts user dashboard configurations with default and task views of applications and task views of different application classes.

Referring to FIG. 15 there is depicted user dashboard configurations with default and task views of applications and task views of different application classes. According in first screen 1510 each application is shown in default mode wherein the content is presented but the menu buttons are closed whereas in second screen 1520 each menu button is open. As indicated by first to third button sequences 1530 to 1550 respectively each menu button is opened from default to open through a user action, in this instance a user swiping their finger across the screen within the application. Optionally, this may be swiping in the region of the menu button or another action such as a tap, double-tap, etc. Hence, as shown each menu button opens to present a list of options, such as Photos, Music, and Video in first button sequence 1530 for an entertainment application, Switch User and Lock in third button sequence 1550 relating to a profile screen and a display box and Tweet in a social media application. The display box may for example indicate the number of followers for someone upon Twitter or the number of unread emails for an email application. In each open menu button the user may select an item within the list through an action such as a tap to a touchpad in the region of the menu item in order to select it and trigger the resulting action.

Figure 16:
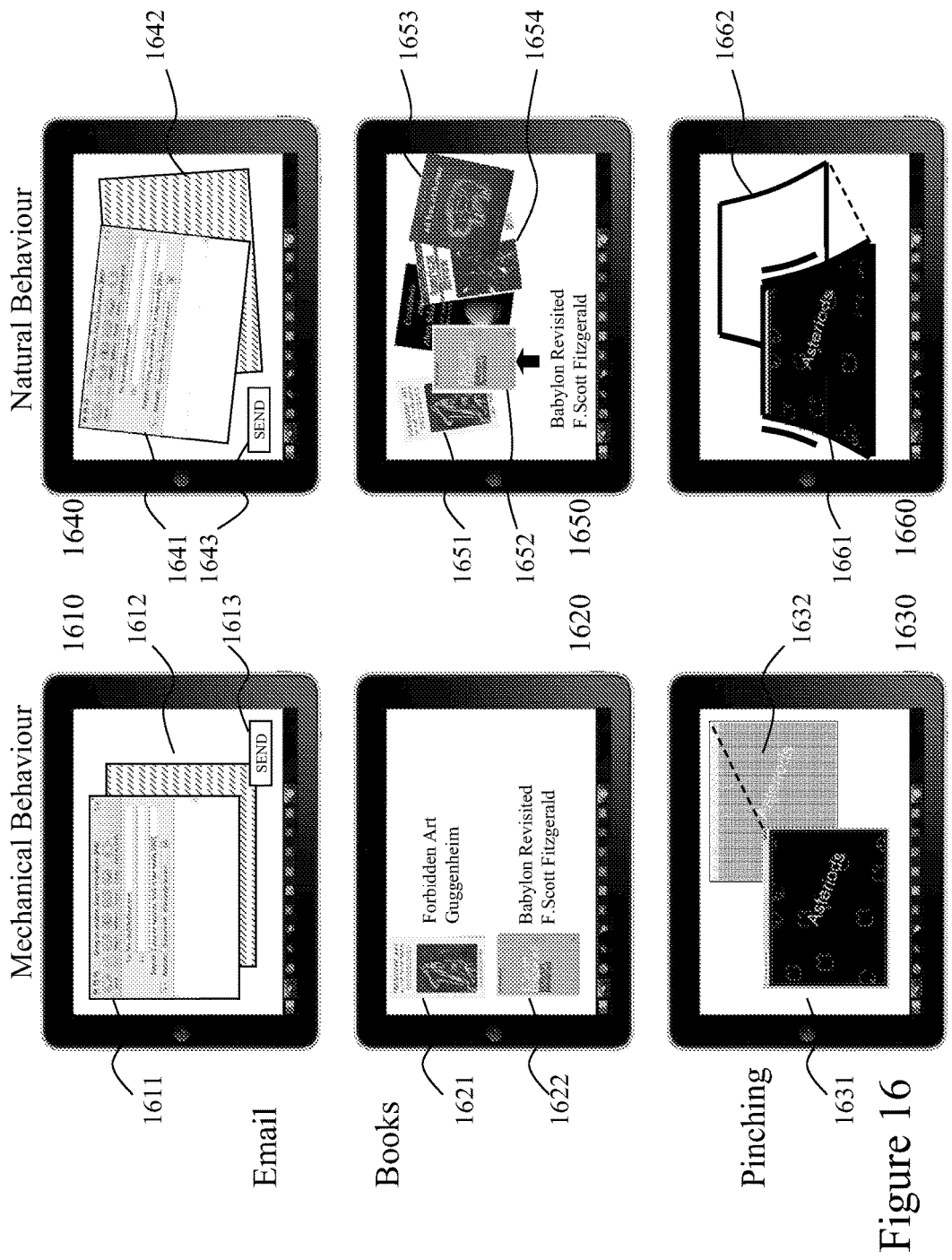
FIG. 16 depicts mechanical versus natural behavior for dashboard layouts and elements within the UI.

Referring to FIG. 16 there is depicted mechanical versus natural behaviour for dashboard layouts and elements within the UI wherein first to third screen images 1610 to 1630 represent mechanical behaviour whereas fourth to sixth screen images 1640 to 1660 respectively represent natural behaviour. Accordingly in first and fourth screen images 1610 and 1640 respectively an email application is presented with windows open relating to emails being draft, sent, received etc. Within the mechanical behaviour of first window 1610 the windows are organized with respect to the screen and stacked, just as within Microsoft Outlook, Google Gmail, Yahoo Mail etc. However, in fourth screen image 1640 these windows are dispersed across the screen in a manner similar to an individual laying papers or sorting papers on their desk. Accordingly, users may be more comfortable with a natural behavior email system rather than a mechanical one. Similarly, in second screen image 1620 an eBook application is displayed as for example within a Kobo reader, iBooks, and Kindle wherein the books are organized linearly in rows, columns, etc. and displays may include virtual bookshelves etc. Fifth screen image 1650 presents the books in a stacked manner, in this instance, laterally although it would be be vertically.

In third screen image 1630 a user is moving a window "Asteroids" from one location to another in a conventional "click" then "drag" action as known to one skilled in the art for moving objects on a display using a mouse, finger etc. In sixth screen image 1660 the user moves the window by "pinching" it with two finger on the screen by moving their two fingers together at the sides of the window so that this motion is not mistaken for another motion with two fingers that the UI recognises such as a zoom or reduce action familiar to Apple iPod and iPad users, which is in itself not a natural action. Accordingly the user "pinches" the window, moves it, and then their fingers are opened back out to release the window in the new location.

Figure 17:
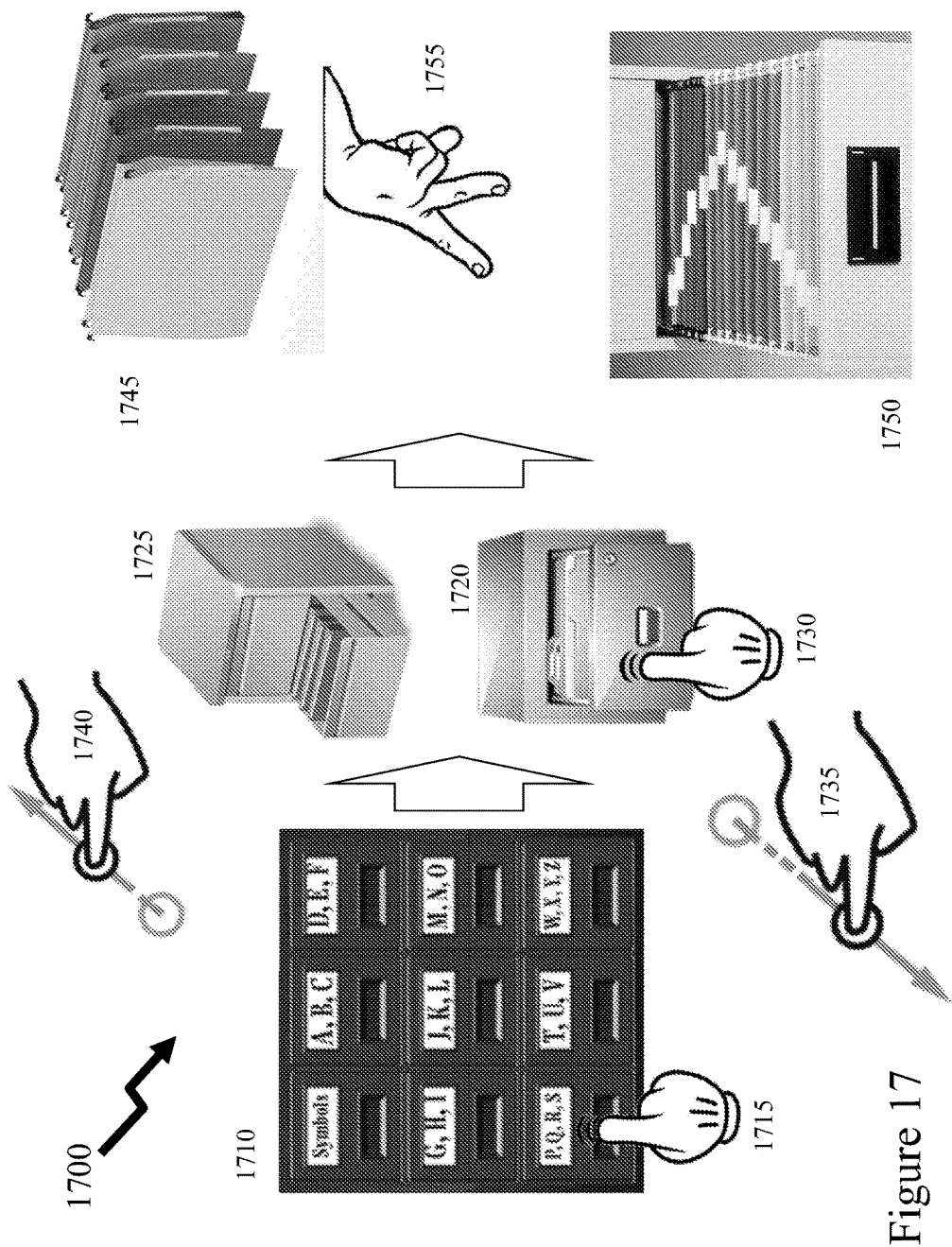
FIG. 17 depicts an exemplary series of elements providing natural behavior to a user of a UI according to an embodiment of the invention.

Referring to FIG. 17 there are depicted an exemplary series of elements providing natural behavior to a user of a UI according to an embodiment of the invention. Accordingly, a user wishes to access information stored within a directory structure on a server. Traditionally they would access this through a list type index wherein the user opens a sub-directory below etc. in a sequence to find the information they are looking for. However, as shown in FIG. 17 the information is displayed as a filing cabinet 1710 wherein the user performs an action on the touchpad with their finger(s) 1715 such that the drawer opens and they are presented with an opening drawer image such as first drawer 1720 and second drawer 1725 wherein the size of the drawer set provides a visual indication to the user of the amount of content within the "drawer" they have selected. The user may then perform a "touch" 1730, a first slide 1735 to open a "drawer", or a second slide 1740 to close a "drawer." Once presented with an open drawer the user image may adjust to first hanging file 1745 or second hanging file 1750 wherein multiple slide actions 1755 result in the user "thumbing" through the files in a manner similar to that of a real filing cabinet drawer. As they "thumb" through the index an image of each item within or group of items may be presented so that the user not only receives headline information on the edge of the index folder, see FIG. 19 for example below, but they are also presented with a front page image or similar, not shown for clarity.

Figure 18:
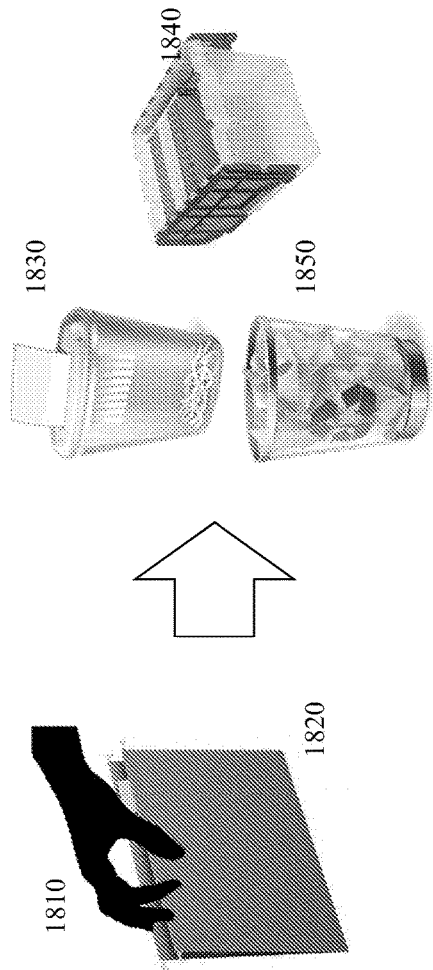
FIG. 18 depicts an exemplary series of elements providing natural behavior to a user of a UI according to an embodiment of the invention.

Accordingly it would be evident to one skilled in the art that natural behaviour may be applied also to the representations of information, data, content within the electronic device or remote storage locations and those natural motions may be applied to selecting, storing, and managing the resulting content. Accordingly referring to FIG. 18 there is depicted an exemplary series of elements providing natural behavior to a user of a UI according to an embodiment of the invention wherein the user selects a file 1820, for example through a diagonal pinching style motion of the fingers 1810 and then their finger motion is tracked to the next action they wish to perform with the selected file or files. Optionally, a folder is represented by a folder image which is well known real world object to the user. For example if the user moves the file/folder over waste bin 1850 then it is placed in the waste bin 1850 for subsequent removal from the system when the waste bin 1850 is emptied. In contrast moving the file 1820 over the tote 1840 would place the file 1820 into an archive and remove it from the current indexed storage contents, whilst moving the file 1820 over the shredder 1830 then the contents of the file 1820 are securely erased from the electronic device and/or associated storage they were removed from as opposed to having the file index modified as occurs with the waste bin.

Figure 19:
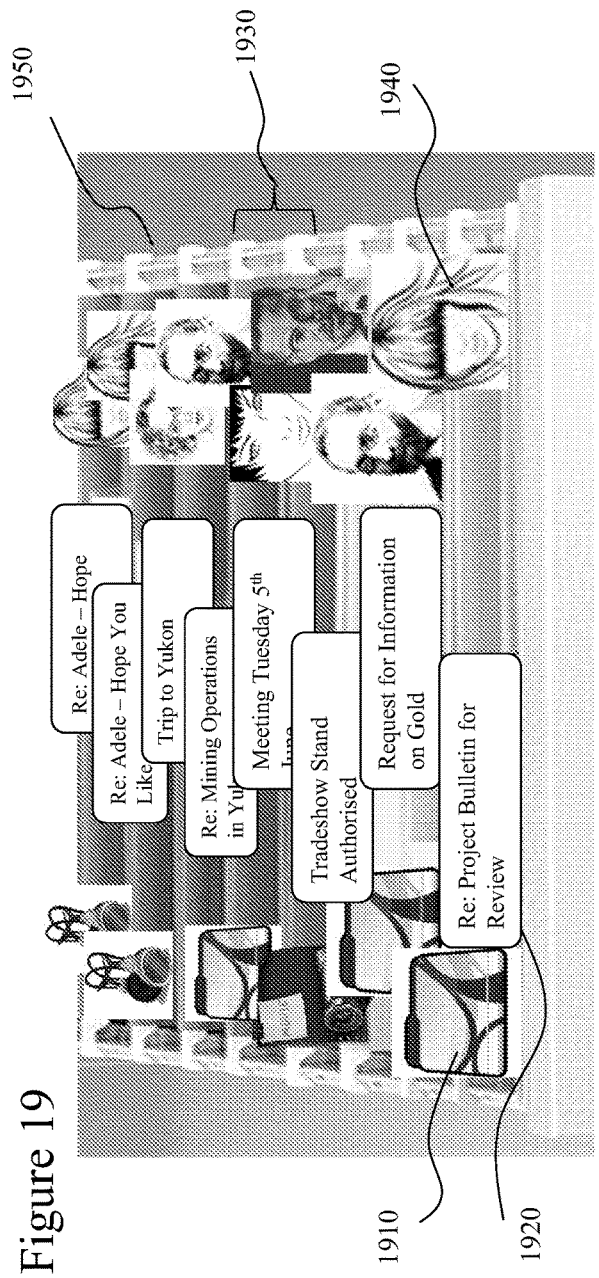
FIG. 19 depicts an exemplary series of elements providing natural behavior to a user of a UI according to an embodiment of the invention.

Now referring to FIG. 19 there is depicted an exemplary series of elements providing natural behavior to a user of a UI according to an embodiment of the invention wherein the user has opened a drawer 1950 within a naturally represented storage system according to an embodiment of the invention wherein in this instance drawer 1950 represents emails. Accordingly, each email is associated with a file folder 1930 within the drawer 1950 and has an index tab 1920 which contains the subject line of the email and a user tab 1940 which contains an image of the sender of the email where a matching image to the user is found by the UI from contacts within the social network applications the user is registered with which may include LinkedIn (professional) and Facebook (personal). The user may be prompted to assign an image to a user where there is no match or the user may elect to replace an image with another they prefer such as for example a devil, joker, animal, object etc. which provides an association of the individual to the user. Also depicted are icons 1910 representative of the type of attachment with the email such as PDF, movie, audio file, etc.

Figure 20:
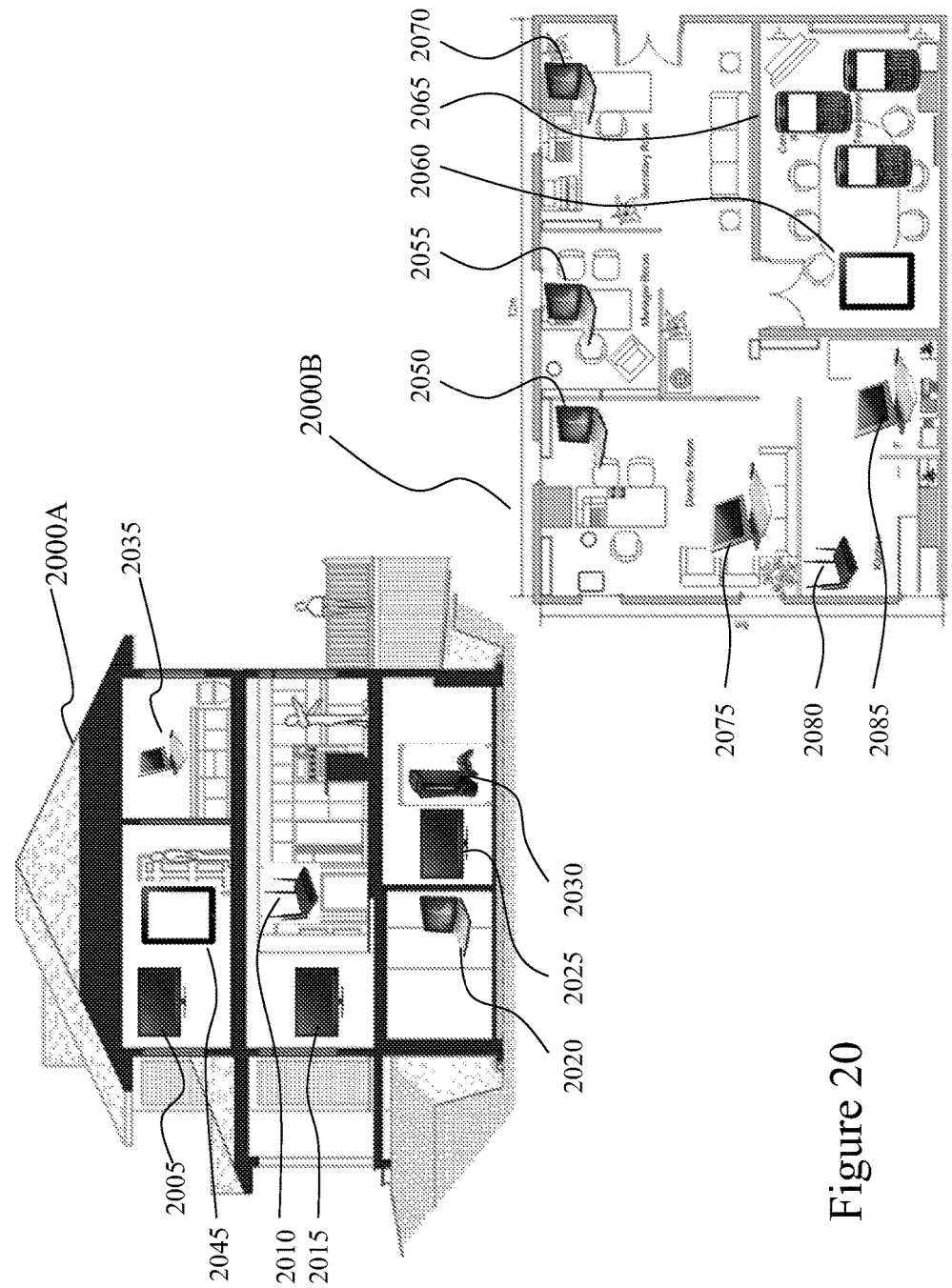
FIG. 20 depicts residential and office environments and elements within that provide micro-contexts for UIs according to an embodiment of the invention.

Now referring to FIG. 20 there are depicted residential and office environments 2000A and 2000B respectively and elements within these that provide micro-contexts for UIs according to embodiments of the invention. Accordingly residential environment 2000A comprises a plurality of rooms within one of which is Wi-Fi node 2010 and typically as single Wi-Fi node 2010 will cover a single residential environment 2000A and further as most residential users can see multiple local residential Wi-Fi nodes within urban environments. Accordingly Wi-Fi node 2020 when associated to a tablet 2045 would allow the UI to establish the macro-context as "home" but nothing more. Within the residential environment 2000A are first to third televisions 2005, 2015, and 2025 respectively within a bedroom, living room and basement playroom; gaming console 2030 in the basement, laptop within basement office, and laptop 2035 within another bedroom. Accordingly the tablet 2045 may establish associations with these other electronic devices in order to refine the macro-context to a micro-context.

For example if the tablet 2045 associates with first television 2005 then the user will be close to the bedroom whereas if it associates to third television 2025 and gaming console 2030 then it is close to the basement playroom. If the associations include device identities which are verified by the user then only an association with one of the three televisions is sufficient. For example, the user is in the basement and the UI is triggered by the user or triggers for the user a new contextual dashboard process then when the association to the third television 2025 is made the identity is stored as part of the micro-context. Accordingly if the gaming console 2030 is absent or unpowered then the micro-context for the "basement playscreen" contextual dashboard does not require detection of both the third television 2025 and gaming console 2030.

It would be evident to one skilled in the art that the tablet 2045 may associate with both first and second televisions 2005 and 2015 due to the range of the Wi-Fi (IEEE 802.11)/WiMAX (IEEE 802.16) wireless transmitters and receivers. Accordingly the UI may selectively control the wireless transmitter within the tablet 2045 to reduce the range of the wireless transmitter, e.g. IEEE 802.11 Wi-Fi until the electronic associations are reduced to a level such that only those elements within the immediate vicinity rather than the entire residential environment and/or neighbourhood are identified as part of the wireless environment. Alternatively, the micro-context determination may exploit IEEE 802.15 or Bluetooth as a shorter range wireless interface to establish micro-context with IEEE 802.11/802.16 Wi-Fi/WiMAX for macro-context.

Referring to commercial environment 2000B a small office configuration is laid out comprising offices with first and second desktops 2075 and 2085 and first to third laptops 2055, 2070, and 2050 which are interfaced to Wi-Fi node 2080. Accordingly the user's tablet 2060 may be configured to establish a contextual dashboard to work based upon an association with the Wi-Fi node 2080. Micro-contexts may for example be triggered through an association of the tablet 2060 to first laptop 2050 as putting the user within their office but an association establishing multiple unknown smartphones 2065 may establish a micro-context of the meeting room (boardroom).

It would be evident to one skilled in the art that the number of contextual dashboards may be limited for some users, wherein in fact the UI essentially provides only a single contextual dashboard, and be significant for others who may have multiple contextual dashboards associated with home, work, recreation, travel etc. for themselves and that these may be present for others within their family. Accordingly a tablet for a family of four, two adults and two children, may have the following 12 contextual dashboards:

Home=7, a macro-context associated with each member of the family plus a micro-contexts associated for each adult working at home, plus 1 micro-context for the adults removing parental controls for their bedroom;

School=2, a macro-context associated with each child;

Work=2, a macro-context associated with each adult; and

Travel=1, a macro-context associated with all family members.

Figure 21:
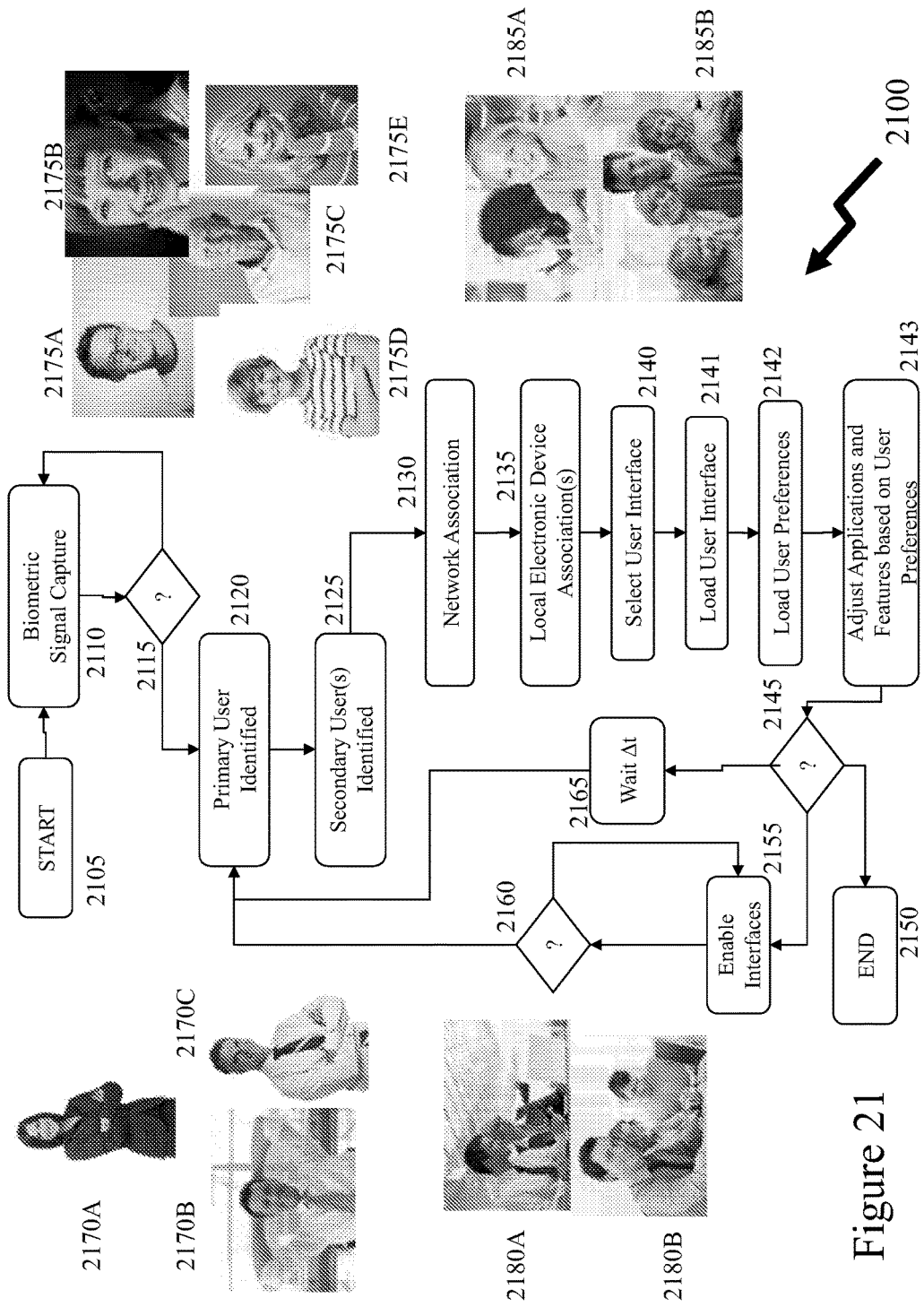
FIG. 21 depicts an exemplary process flow for user and context determination of macro- and micro-context factors according to an embodiment of the invention.

Now referring to FIG. 21 there is depicted an exemplary process flow 2100 for user and context determination of macro- and micro-context factors according to an embodiment of the invention for a portable electronic device (PED). Accordingly the process begins at step 2100 where a user picks up the PED and the UI receives accelerometer data which is used to trigger the UI to enter the lock screen from a sleep mode wherein in step 2110 a user provides the biometric input which is evaluated in step 2115 to determine whether the user is authorised. An example of steps 2110 and 2115 is presented above in respect of FIG. 3. In step 2120 the UI determines identity of the primary user for whom biometric verification was obtained and then proceeds in step 2125 to determine whether secondary users are present. For example the UI may analyse the remainder of the image taken for a facial recognition of the user to determine whether there are other individuals in the image as well as receiving additional input such as audio to form part of the determination of secondary users.

Next in step 2130 the UI proceeds to determine network associations for the PED and then local electronic device associations in step 2135. These are all used in conjunction with primary and secondary user data and other contextual information including, but not limited to, GPS data, accelerometer data, date, time, background of image (where facial recognition is employed) in step 2140 to determine the contextual dashboard to be employed. This is then loaded in step 2141 wherein the UI proceeds to load the user preferences associated with the selected dashboard of the plurality of available dashboards. Next in step 2143 the UI adjusts the features of the applications and the applications based upon the user preferences. For example, where the user is identified to be "Tom" working at their office then the email application opened is Microsoft Outlook and the preferences are their user name and password but where it is determined "Tom" is at home then the application may be Google Gmail and no preferences are used.

Next in step 2745 the process determines whether the UI is established in periodic or single access mode, the former relating to periodic verification of the macro- and micro-context information and the latter to no subsequent verification until a timeout or other condition is met and the screen locks. If the latter the process moves to step 2150 and stops, otherwise it proceeds to step 2155 wherein periodic verification is to be based upon environmental data or step 2165 wherein the periodic verification is based upon a time interval, $\Delta\tau$. If the process proceeds on time interval basis then after a delay of $\Delta\tau$ the process moves to step 2120. If based on environmental data then the PED enables interfaces in step 2155 and looks for additional user characteristics in step 2160 wherein absence results in the process looping back to step 2155 and presence results in the process proceeding back to step 2120.

It would be evident that rather than proceeding to loop back to step 2120 that the process may alternatively loop back to step 2110 and repeat biometric verification. Optionally this pauses all applications until verification is provided, such as with a fingerprint and facial recognition, or without pause wherein a verification may be processed without disrupting the user's activity such as with facial recognition. Accordingly biometric verification may be allowed on the electronic device for first to fifth family members 2175A through 2175E representing a father, mother, son, daughter, and grandfather and first to third staff 2170A through 2170C representing work colleagues. Optionally a user, such as father, being first family member 2175A may appear in both and hence second staff 2170B may also be the same individual. As such the primary user would be selected from first to fifth family members 2175A through 2175E and first to third staff 2170A through 2170C.

Secondary users may be identified from the unlock sequence, such as within the image captured for facial recognition or through interfaces on the PED such as the microphone during operation of the PED with the UI unlocked so that these are captured in the absence of electronic device associations with the secondary user's PEDs or FEDs. It would be evident that secondary user is a broad term in this context as these individuals may not be actually using the PED but are within the micro-environment of the user and hence impact the micro-context. For example, an adult user unlocking the PED may establish Google Image searches to be unrestricted on content but this may be inappropriate where the secondary users are present such as work colleagues, as depicted in first and second work groups 2180A and 2180B or children as depicted in first and second family groups 2185A and 2815B respectively.

It would be evident to one skilled in the art that based upon the macro- and micro-context aspects of the UI that the lock in screen may be similarly considered a contextual dashboard such that first and third staff 2170A and 2170C may only unlock the PED according to an embodiment of the invention when the macro- and micro-context select a contextual dashboard having them as authorised users. Accordingly, a manager may authorise their administration assistant to access their PED at work, no one else in travel mode, and their family when the PED is at home. Accordingly, the manager may have full access rights to certain applications and their administration assistant limited access rights to those applications and his family no access rights. Similarly the user's family would be unable to unlock the PED at the user's office and perhaps only the adults the PED in travel mode to limit children playing with it.

It would be evident to one skilled in the art how evolution of the micro-context concept may be evolved from one wherein these are statically allocated at user log-in to one wherein they are allocated dynamically in dependence upon the actual environment. For example the following scenarios relating to dynamically assigned contextual dashboards may be implemented according to embodiments of the invention:

User A logs-in and UI establishes a contextual dashboard but they pass the PED to another user, User B, who now has access to the User A contextual dashboard plus preferences, accordingly the UI is monitoring periodically taken digital images and notes the user change and swaps to either User B contextual dashboard where recognised user or guest screen;

User A logs-in and UI establishes a contextual dashboard but now the user puts the device down onto to a table and hence they are now no linger visible if the UI is checking image but their speech is now recognised and the UI maintains the current contextual dashboard;

User A logs-in and UI establishes a contextual dashboard but now UI detects another individual behind User A and adjusts the contextual dashboard or closes it down and warns User A;

User A logs-in and UI establishes a first contextual dashboard but now User A moves with the PED and maintains activity with it and User A now enters another recognized micro- and macro-context environment such that the UI now changes the contextual dashboard from the original context to the new context, where such changes may be evolved slowly such that for example applications currently not in use are adjusted immediately but those in use are maintained or gradually adjusted where possible;

User A logs-in and UI establishes a contextual dashboard with the user displaying content on another display associated with the PED and the PED display is presenting a large keyboard, the user then moves and the UI automatically updates the contextual dashboard such that the content is now presented to the user on their PED seamlessly and the keyboard is reduced to that normally presented to the user on the PED.

It would be evident to one skilled in the art that UI contextual dashboards according to embodiments of the invention by providing macro-context and micro-context variations where selected by the user provide for a dynamic migration of the UI according to the user's activities and schedule. How many contextual dashboards a user establishes is their personal preference although a PED or FED may provide initially a limited number of default contextual dashboards for configuration. In other embodiments of the invention the UI correlates and samples macro-context and micro-context information to determine whether a user may benefit from another contextual dashboard in addition to those currently established.

Figure 22:
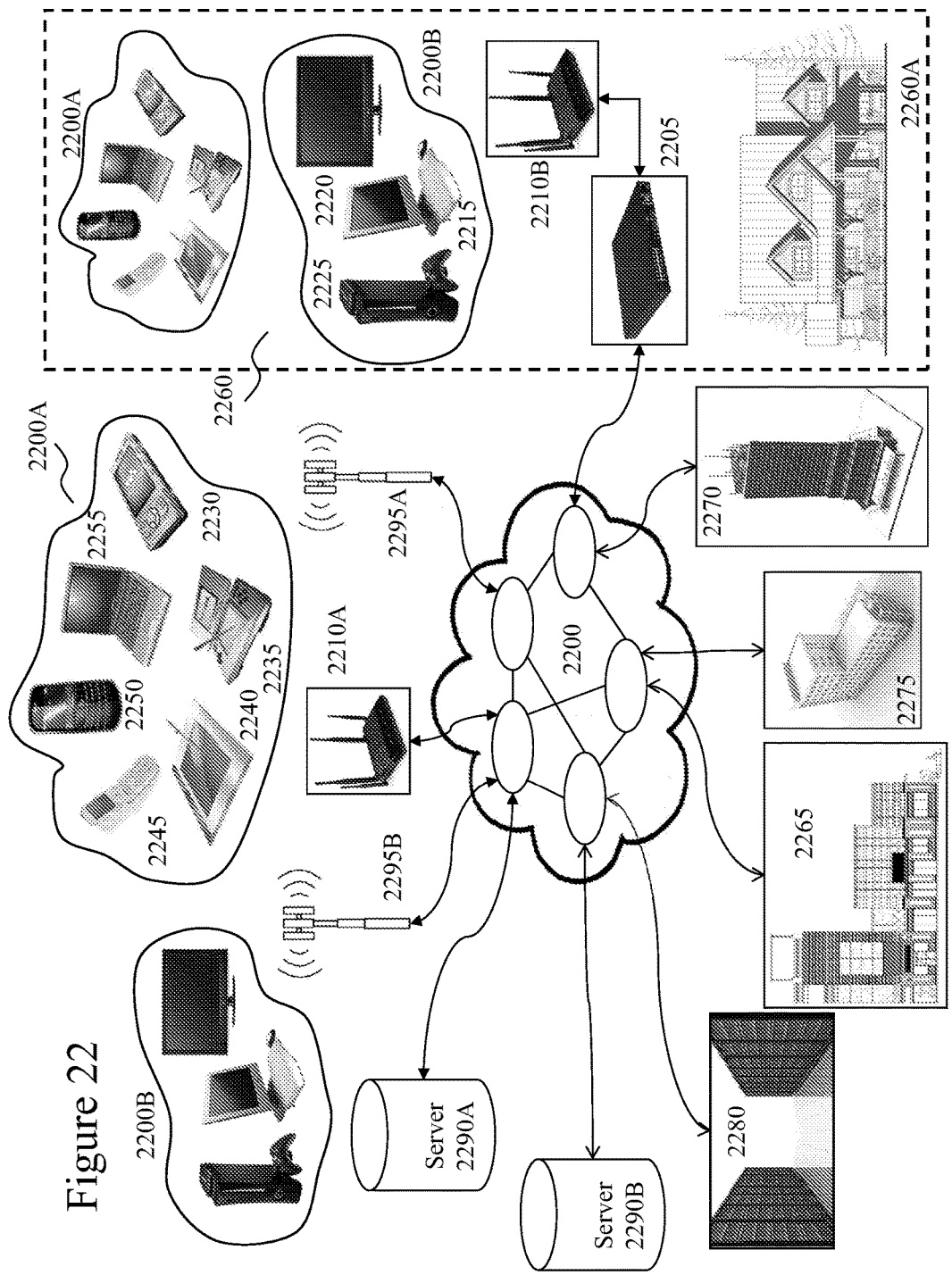
FIG. 22 depicts a network supporting communications to and from electronic devices implementing contextual based UIs according to embodiments of the invention.

Now referring to FIG. 22 there is depicted a network 2200 supporting communications to and from electronic devices implementing contextual based UIs according to embodiments of the invention. As shown first and second user groups 2200A and 2200B respectively interface to a telecommunications network 2200. Within the representative telecommunication architecture a remote central exchange 2280 communicates with the remainder of a telecommunication service providers network via the network 2200 which may include for example long-haul OC-48/OC-192 backbone elements, an OC-48 wide area network (WAN), a Passive Optical Network, and a Wireless Link. The central exchange 2280 is connected via the network 2200 to local, regional, and international exchanges (not shown for clarity) and therein through network 2200 to first and second wireless access points (AP) 2295A and 2295B respectively which provide Wi-Fi cells for first and second user groups 2200A and 2200B respectively. Also connected to the network 2200 are first and second Wi-Fi nodes 2210A and 2210B, the latter of which being coupled to network 2200 via router 2205. Second Wi-Fi node 2210B is associated with residential building 2260A and environment 2260 within which are first and second user groups 2200A and 2200B. Second user group 2200B may also be connected to the network 2200 via wired interfaces including, but not limited to, DSL, Dial-Up, DOCSIS, Ethernet, G.hn, ISDN, MoCA, PON, and Power line communication (PLC) which may or may not be routed through a router such as router 2205.

Within the cell associated with first AP 2210A the first group of users 2200A may employ a variety of portable electronic devices including for example, laptop computer 2255, portable gaming console 2235, tablet computer 2240, smartphone 2250, cellular telephone 2245 as well as portable multimedia player 2230. Within the cell associated with second AP 2210B are the second group of users 2200B which may employ a variety of fixed electronic devices including for example gaming console 2225, personal computer 2215 and wireless/Internet enabled television 2220 as well as cable modem 2205.

Also connected to the network 2200 are first and second APs which provide, for example, cellular GSM (Global System for Mobile Communications) telephony services as well as 3G and 4G evolved services with enhanced data transport support. Second AP 2295B provides coverage in the exemplary embodiment to first and second user groups 2200A and 2200B. Alternatively the first and second user groups 2200A and 2200B may be geographically disparate and access the network 2200 through multiple APs, not shown for clarity, distributed geographically by the network operator or operators. First AP 2295A as show provides coverage to first user group 2200A and environment 2260, which comprises second user group 2200B as well as first user group 2200A. Accordingly, the first and second user groups 2200A and 2200B may according to their particular communications interfaces communicate to the network 2200 through one or more wireless communications standards such as, for example, IEEE 802.11, IEEE 802.15, IEEE 802.16, IEEE 802.20, UMTS, GSM 850, GSM 900, GSM 1800, GSM 1900, GPRS, ITU-R 5.138, ITU-R 5.150, ITU-R 5.280, and IMT-2000. It would be evident to one skilled in the art that many portable and fixed electronic devices may support multiple wireless protocols simultaneously, such that for example a user may employ GSM services such as telephony and SMS and Wi-Fi/WiMAX data transmission, VOIP and Internet access. Accordingly portable electronic devices within first user group 2200A may form associations either through standards such as IEEE 802.15 and Bluetooth as well in an ad-hoc manner.

Also connected to the network 2200 are retail environment 2265, first commercial environment 2270, and second commercial environment 2275 as well as first and second servers 2290A and 2290B which together with others not shown for clarity, may host according to embodiments of the inventions multiple services associated with a provider of the software operating system(s) and/or software application(s) associated with the electronic device(s), a provider of the electronic device, provider of one or more aspects of wired and/or wireless communications, product databases, inventory management databases, retail pricing databases, license databases, customer databases, websites, and software applications for download to or access by fixed and portable electronic devices. First and second primary content sources 2290A and 2290B may also host for example other Internet services such as a search engine, financial services, third party applications and other Internet based services.

Figure 23:
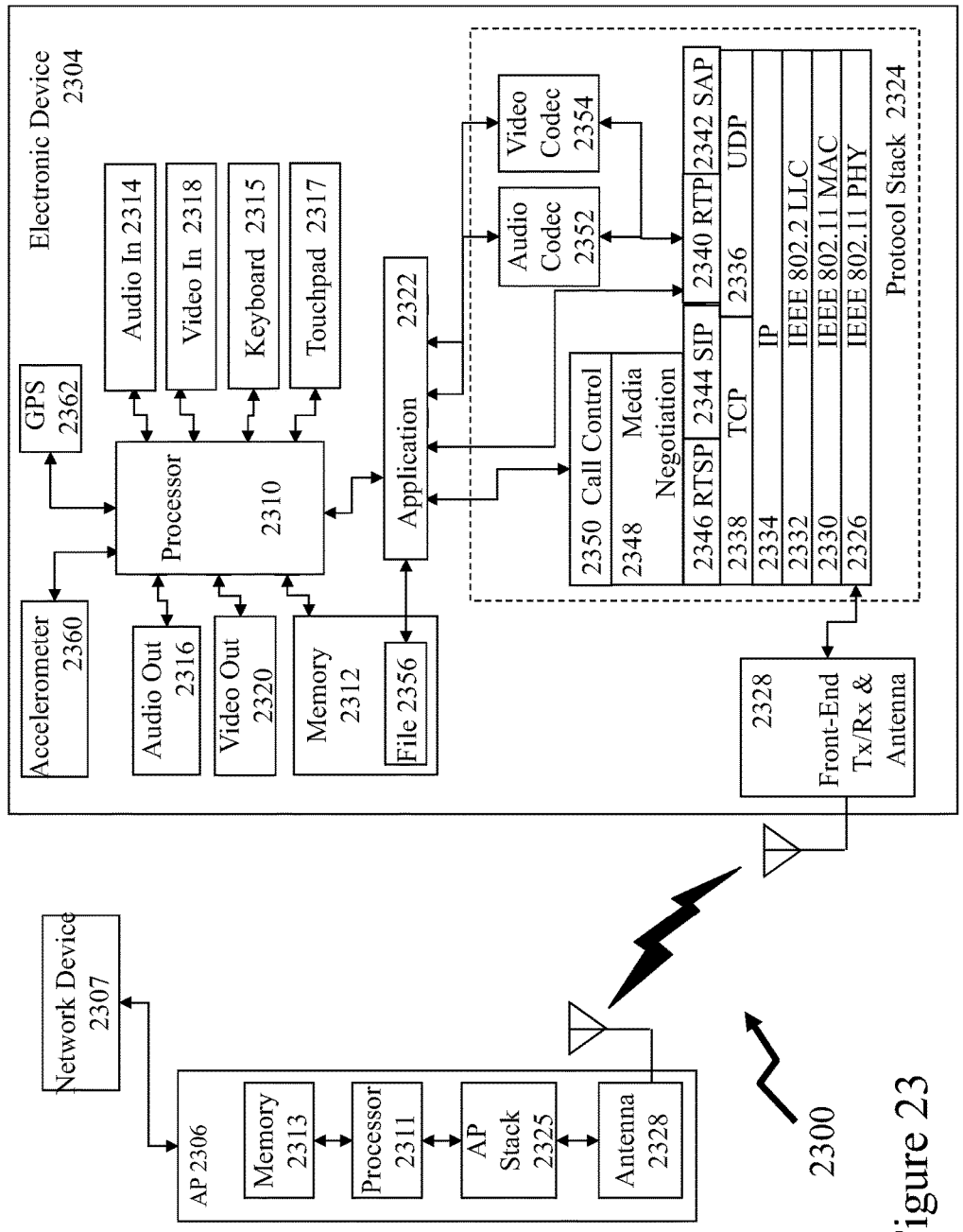
FIG. 23 depicts an electronic device and network access point supporting contextual based UIs according to embodiments of the invention.

FIG. 23 there is depicted an electronic device 2304 and network access point 2307 supporting contextual based UIs according to embodiments of the invention. Electronic device 2304 may for example be a portable electronic device or a fixed electronic device and may include additional elements above and beyond those described and depicted. Also depicted within the electronic device 2304 is the protocol architecture as part of a simplified functional diagram of a system 2300 that includes an electronic device 2304, such as a smartphone 2255, an access point (AP) 2306, such as first Wi-Fi AP 610, and one or more network devices 2307, such as communication servers, streaming media servers, and routers for example such as first and second servers 175 and 185 respectively. Network devices 2307 may be coupled to AP 2306 via any combination of networks, wired, wireless and/or optical communication links such as discussed above in respect of FIG. 1. The electronic device 2304 includes one or more processors 2310 and a memory 2312 coupled to processor(s) 2310. AP 2306 also includes one or more processors 2311 and a memory 2313 coupled to processor(s) 2311. A non-exhaustive list of examples for any of processors 2310 and 2311 includes a central processing unit (CPU), a digital signal processor (DSP), a reduced instruction set computer (RISC), a complex instruction set computer (CISC) and the like. Furthermore, any of processors 2310 and 2311 may be part of application specific integrated circuits (ASICs) or may be a part of application specific standard products (ASSPs). A non-exhaustive list of examples for memories 2312 and 2313 includes any combination of the following semiconductor devices such as registers, latches, ROM, EEPROM, flash memory devices, non-volatile random access memory devices (NVRAM), SDRAM, DRAM, double data rate (DDR) memory devices, SRAM, universal serial bus (USB) removable memory, and the like.

Electronic device 2304 may include an audio input element 2314, for example a microphone, and an audio output element 2316, for example, a speaker, coupled to any of processors 2310. Electronic device 2304 may include a video input element 2318, for example, a video camera, and a video output element 2320, for example an LCD display, coupled to any of processors 2310. Electronic device 2304 also includes a keyboard 2315 and touchpad 2317 which may for example be a physical keyboard and touchpad allowing the user to enter content or select functions within one of more applications 2322. Alternatively the keyboard 2315 and touchpad 2317 may be predetermined regions of a touch sensitive element forming part of the display within the electronic device 2304. The one or more applications 2322 that are typically stored in memory 2312 and are executable by any combination of processors 2310. Electronic device 2304 also includes accelerometer 2360 providing three-dimensional motion input to the process 2310 and GPS 2362 which provides geographical location information to processor 2310.

Electronic device 2304 includes a protocol stack 2324 and AP 2306 includes a communication stack 2325. Within system 2300 protocol stack 2324 is shown as IEEE 802.11 protocol stack but alternatively may exploit other protocol stacks such as an Internet Engineering Task Force (IETF) multimedia protocol stack for example. Likewise AP stack 2325 exploits a protocol stack but is not expanded for clarity. Elements of protocol stack 2324 and AP stack 2325 may be implemented in any combination of software, firmware and/or hardware. Protocol stack 2324 includes an IEEE 802.11-compatible PHY module 2326 that is coupled to one or more Front-End Tx/Rx & Antenna 2328, an IEEE 802.11-compatible MAC module 2330 coupled to an IEEE 802.2-compatible LLC module 2332. Protocol stack 2324 includes a network layer IP module 2334, a transport layer User Datagram Protocol (UDP) module 2336 and a transport layer Transmission Control Protocol (TCP) module 2338.

Protocol stack 2324 also includes a session layer Real Time Transport Protocol (RTP) module 2340, a Session Announcement Protocol (SAP) module 2342, a Session Initiation Protocol (SIP) module 2344 and a Real Time Streaming Protocol (RTSP) module 2346. Protocol stack 2324 includes a presentation layer media negotiation module 2348, a call control module 2350, one or more audio codecs 2352 and one or more video codecs 2354. Applications 2322 may be able to create maintain and/or terminate communication sessions with any of devices 2307 by way of AP 2306. Typically, applications 2322 may activate any of the SAP, SIP, RTSP, media negotiation and call control modules for that purpose. Typically, information may propagate from the SAP, SIP, RTSP, media negotiation and call control modules to PHY module 2326 through TCP module 2338, IP module 2334, LLC module 2332 and MAC module 2330.

It would be apparent to one skilled in the art that elements of the electronic device 2304 may also be implemented within the AP 2306 including but not limited to one or more elements of the protocol stack 2324, including for example an IEEE 802.11-compatible PHY module, an IEEE 802.11-compatible MAC module, and an IEEE 802.2-compatible LLC module 2332. The AP 2306 may additionally include a network layer IP module, a transport layer User Datagram Protocol (UDP) module and a transport layer Transmission Control Protocol (TCP) module as well as a session layer Real Time Transport Protocol (RTP) module, a Session Announcement Protocol (SAP) module, a Session Initiation Protocol (SIP) module and a Real Time Streaming Protocol (RTSP) module, media negotiation module, and a call control module.

Portable and fixed electronic devices represented by electronic device 2304 may include one or more additional wireless or wired interfaces in addition to the depicted IEEE 802.11 interface which may be selected from the group comprising IEEE 802.15, IEEE 802.16, IEEE 802.20, UMTS, GSM 850, GSM 900, GSM 1800, GSM 1900, GPRS, ITU-R 5.138, ITU-R 5.150, ITU-R 5.280, IMT-2000, DSL, Dial-Up, DOCSIS, Ethernet, G.hn, ISDN, MoCA, PON, and Power line communication (PLC).

Figure 24:
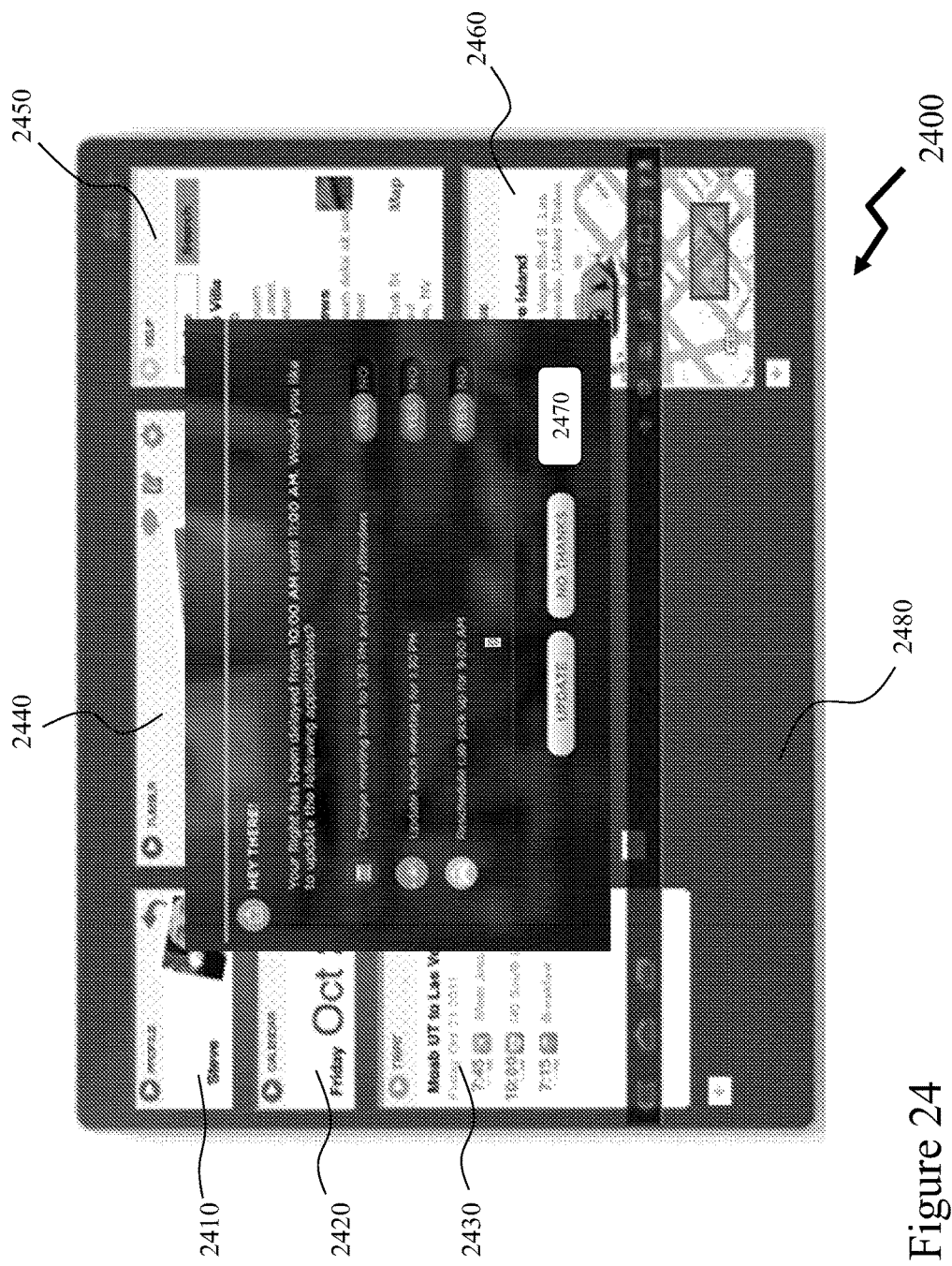
FIG. 24 depicts an exemplary screen from a smart agent notifying a user of impacts to activities from a notification received in one application according to an embodiment of the invention.

Referring to FIG. 24 there is depicted an exemplary screen 2400 with a notification 2470 from a smart agent notifying a user of impacts to activities from a notification received in one application according to an embodiment of the invention. Accordingly, the user is using an electronic device with a contextual dashboard 2480 which presents first to fifth application windows 2420 through 2460 and profile window 2410 to the user. In execution within the electronic device is a smart agent which parses communications to/from one or more applications to identify instances of amendments to data relating to other applications. For example, as depicted the first to fifth applications 2420 to 2460 respectively are Calender, FlightTracker, Tumblr, Yelp and Cab4Me. A schedule amendment relating to the flights of the user is received in FlightTracker indicating that their 10:00 am flight has been delayed to 11:00 am. Accordingly the smart agent determines from Calendar, FlightTracker and Cab4Me that amendments to activities within these should be made. These are shown within notification 2470 as "Change meeting time to 1:30 pm and notify attendees", "Update lunch meeting for 1:30 pm", and "Re-schedule cab pick up for 9:00 am." Against each the notification 2470 provides button options for the user to apply or reject the modifications suggested by the smart agent to the user via notification 2470.

Figure 25:
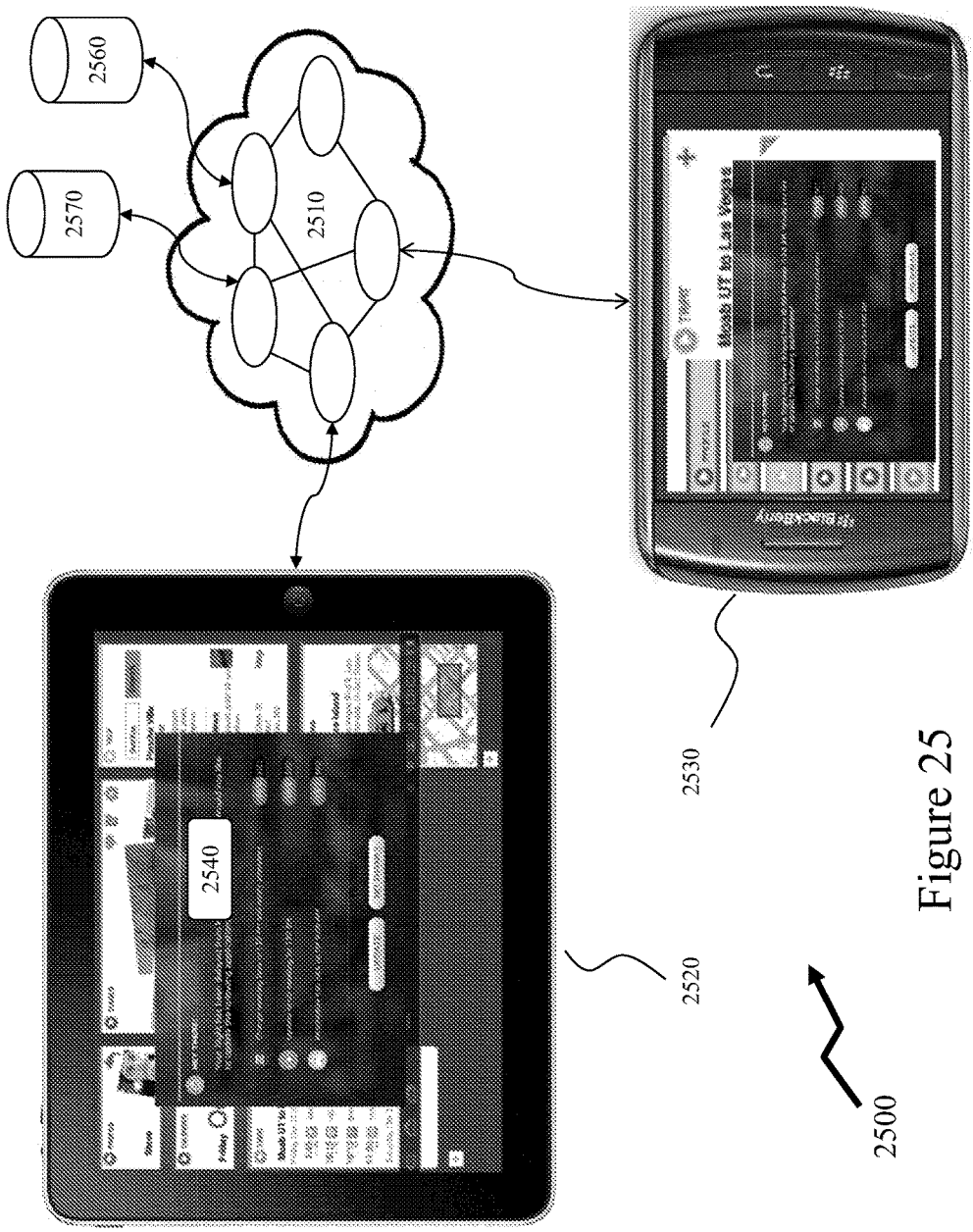
FIG. 25 depicts exemplary screens from smart agents notifying a user of impacts to activities from a notification received in one application according to an embodiment of the invention.

Now referring to FIG. 25 there is depicted exemplary notification system 2500 for smart agents notifying a user of impacts to activities from a notification received in one application according to an embodiment of the invention. Accordingly, a user has a tablet 2520 and smartphone 2530 which are both connected to a network 2550 through wired and/or wireless interfaces that are not shown for clarity. Also connected to network 2550 are first and second servers 2560 and 2570 respectively which host software systems and memory storage relating to one or more applications that the user has accessed and relate to one or more contextual dashboards of the user. The user has previously established a smart agent application as part of their suite of applications which parses communications to and/or from the user's applications to identify instances of communications which contain content impacting other activities within the applications of the user. Where a communication impacts other activities the smart agent provides a notification to the user, which if the user accesses their tablet 2520 is presented as first notification screen 2540 or if they access their smartphone 2530 is presented as second notification 2550. Each of the tablet 2520 and smartphone 2530 otherwise present a contextual dashboard to the user. Accordingly, the user is prompted in the first and second notification screens 2540 and 2550 respectively, based upon the settings established by the user, as to whether they wish to make amendments to other activities and/or provide communications to other users in dependence of the notification and other activities scheduled.

Figure 26:
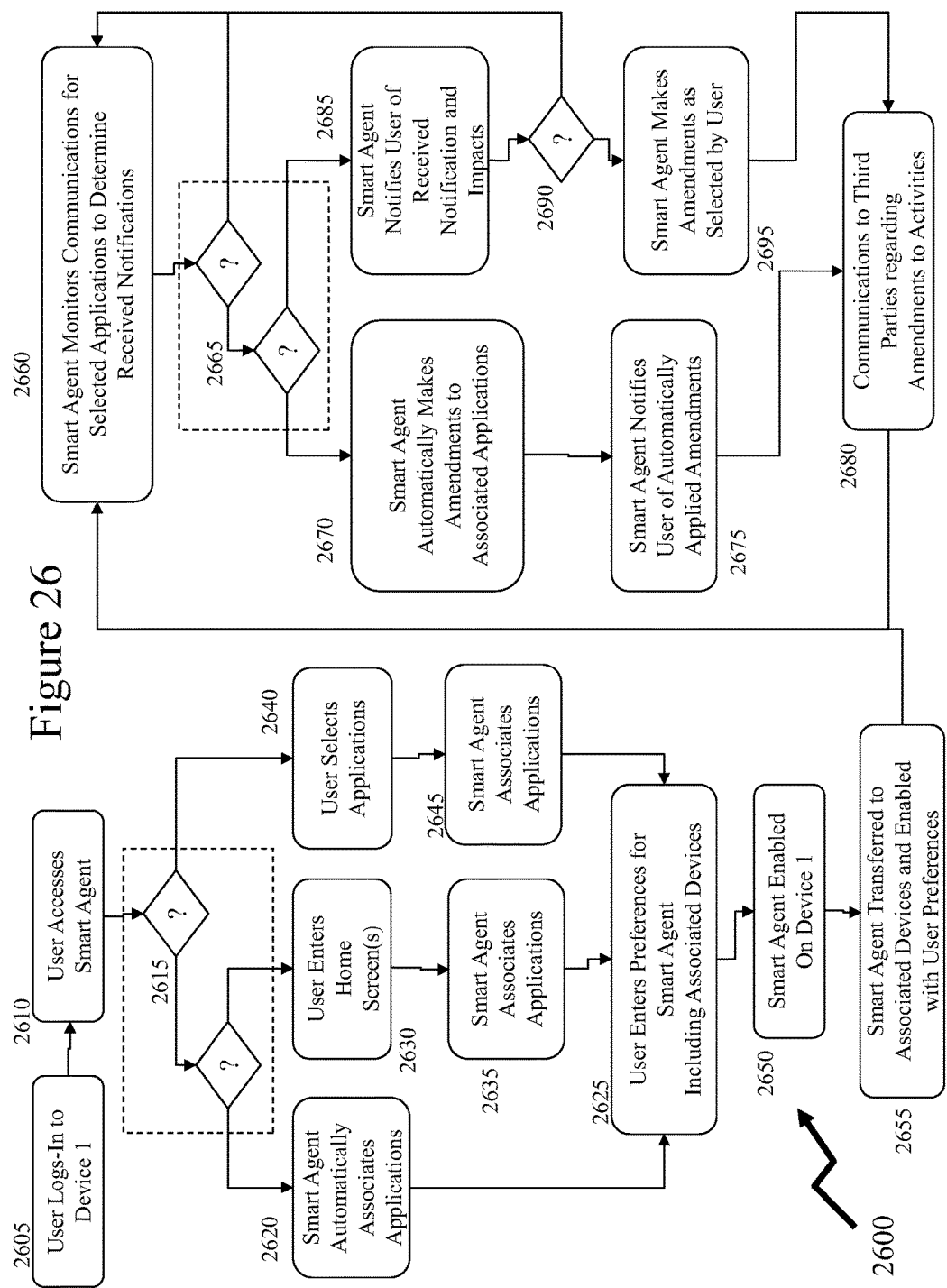
FIG. 26 depicts an exemplary process flow for a user enabling a smart agent providing notifications of amendments to activities arising from a received notification according to an embodiment of the invention.

Referring to FIG. 26 there is depicted an exemplary process flow 2600 for a user enabling a smart agent providing notifications of amendments to activities arising from a received notification according to an embodiment of the invention. At step 2605 a first user, User 1, logs-in to a first electronic device, Device 1, and the process proceeds to step 2610 wherein the user accesses a smart agent function which may for example, be a discrete application accessed or downloaded by the user, a feature within a pre-loaded UI management suite on the user's electronic device, or an application pre-loaded to the user's electronic device. In step 2615 the user is prompted through a series of prompts as to whether they wish to select the applications that are monitored or whether they wish to have the smart agent automatically select the applications based upon a fully automated process or one directed through a selection of home screens.

If the user elects for a fully automated process the process flow proceeds to step 2620 wherein the smart agent automatically associates applications from the user's home screens and then proceeds to step 2625 wherein the user enters preferences for associating other electronic devices. If the user elected a semi-automatic process then they are provided with a list of home screens structured by macro-context and micro-context in step 2630 so that the user can elect for example to associate the smart agent for example with all home screens or only those relating for example to work. Next in step 2635 the smart agent associates those applications within the selected home screens for monitoring and the process proceeds to step 2625. If the user elected for a manual process then in step 2640 they are presented with a list of applications for which monitoring/notifications are appropriate from within their home screens and the user selects which they wish to associate where the process then associates these in step 2645 before proceeding to step 2625.

From step 2625 the smart agent is enabled on the user's electronic device, Device 1, in step 2650 and then the process proceeds to step 2655 wherein the smart agent is transferred and enabled on the other associated electronic devices. The process then proceeds to step 2660 where smart agent monitors communications for the selects applications to determine whether any received notifications warrant action. In step 2665 if no notifications are received the process loops back to step 2660 otherwise it is determined the degree of automation established by the user. If an automated process was selected then the process proceeds to step 2670 otherwise it proceeds to step 2685. In step 2670 the smart agent automatically makes any applicable amendments to the associated applications, proceeds to step 2675 wherein it automatically notifies the user of applied amendments and then proceeds to step 2680 wherein communications to third parties regarding the amendments are made and then loops back to step 2660. If a manual process was selected then the process in 2685 notifies the user of the received notifications and the impacts to other activities before prompting the user in step 2690 as to whether they wish to make amendments or not through a notification window such as discussed above in respect of notification 2470 in FIG. 24. If the user elects to make one or more amendments then these are implemented in step 2695 otherwise the process loops back to 2660. From 2695 the process proceeds to step 2680, notifies third parties of the amendments and loops back to step 2660.

It would be evident that the smart agent application may also be employed on electronic devices without contextual dashboards or that the associated electronic device does not employ contextual dashboards whilst the primary electronic device does or vice-versa. It would also be evident that the smart agent applications installed and/or operating on the electronic devices may communicate to a software system in execution upon remote servers such that communications relating to applications for the user are parsed by the remote server based software system to that notifications can be provided to the user upon a user re-starting or re-opening a UI upon an electronic device separately to requiring all the applications to start-up and receive the notifications. Within the descriptions of embodiments of the invention in respect of FIGS. 24 through 26 have been discussed with respect to activities it would be evident to one skilled in the art that alternatively the amendments made and notifications received may relate to other aspects of the applications including, but not limited to, documents received and actions made regarding updates.

It would be evident to one skilled in the art that the concepts discussed above in respect of contextual dashboards whilst being primarily considered from the viewpoints of tablet computers, smart phones, laptop computers and similar portable electronic devices that the underlying principles may be applied to a wider variety of devices including for example portable gaming consoles, such as Nintendo DS and Sony PSP; portable music players such as Apple iPod, and eReaders such as Kobo, Kindle, and Sony Reader. It would also be evident that whilst the embodiments of the invention have been described with respect to a UI that they may also be employed within software applications that form part of a contextual dashboard or as discrete stand applications in other operating environments such as Windows, Mac OS, Linux and Android for example.

It would also be evident to one skilled in the art that embodiments of the invention may be implemented without other described elements. For example, smart agent notifications and contextual dashboards may be employed without biometric verification of a user to lock or unlock the electronic device. It would also be evident that establishment of a user's identity, with biometric verification or through alternate credential entry such as identity/password, with contextual dashboards as described with respect to embodiments of the invention provides for applications that are open and immediately accessible/presenting information rather than merely accessible through a UI with application icons to selectively launch them. It would therefore be evident that the settings/preferences for applications may be established for these applications in dependence of the user's identity.

Specific details are given in the above description to provide a thorough understanding of the embodiments. However, it is understood that the embodiments may be practiced without these specific details. For example, circuits may be shown in block diagrams in order not to obscure the embodiments in unnecessary detail. In other instances, well-known circuits, processes, algorithms, structures, and techniques may be shown without unnecessary detail in order to avoid obscuring the embodiments.

Implementation of the techniques, blocks, steps and means described above may be done in various ways. For example, these techniques, blocks, steps and means may be implemented in hardware, software, or a combination thereof. For a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described above and/or a combination thereof.

Also, it is noted that the embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be rearranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Furthermore, embodiments may be implemented by hardware, software, scripting languages, firmware, middleware, microcode, hardware description languages and/or any combination thereof. When implemented in software, firmware, middleware, scripting language and/or microcode, the program code or code segments to perform the necessary tasks may be stored in a machine readable medium, such as a storage medium. A code segment or machine-executable instruction may represent a procedure, a function, a subprogram, a program, a routine, a subroutine, a module, a software package, a script, a class, or any combination of instructions, data structures and/or program statements. A code segment may be coupled to another code segment or a hardware circuit by passing and/or receiving information, data, arguments, parameters and/or memory contents. Information, arguments, parameters, data, etc. may be passed, forwarded, or transmitted via any suitable means including memory sharing, message passing, token passing, network transmission, etc.

For a firmware and/or software implementation, the methodologies may be implemented with modules (e.g., procedures, functions, and so on) that perform the functions described herein. Any machine-readable medium tangibly embodying instructions may be used in implementing the methodologies described herein. For example, software codes may be stored in a memory. Memory may be implemented within the processor or external to the processor and may vary in implementation where the memory is employed in storing software codes for subsequent execution to that when the memory is employed in executing the software codes. As used herein the term "memory" refers to any type of long term, short term, volatile, nonvolatile, or other storage medium and is not to be limited to any particular type of memory or number of memories, or type of media upon which memory is stored.

Moreover, as disclosed herein, the term "storage medium" may represent one or more devices for storing data, including read only memory (ROM), random access memory (RAM), magnetic RAM, core memory, magnetic disk storage mediums, optical storage mediums, flash memory devices and/or other machine readable mediums for storing information. The term "machine-readable medium" includes, but is not limited to portable or fixed storage devices, optical storage devices, wireless channels and/or various other mediums capable of storing, containing or carrying instruction(s) and/or data.

The methodologies described herein are, in one or more embodiments, performable by a machine which includes one or more processors that accept code segments containing instructions. For any of the methods described herein, when the instructions are executed by the machine, the machine performs the method. Any machine capable of executing a set of instructions (sequential or otherwise) that specify actions to be taken by that machine are included. Thus, a typical machine may be exemplified by a typical processing system that includes one or more processors. Each processor may include one or more of a CPU, a graphics-processing unit, and a programmable DSP unit. The processing system further may include a memory subsystem including main RAM and/or a static RAM, and/or ROM. A bus subsystem may be included for communicating between the components. If the processing system requires a display, such a display may be included, e.g., a liquid crystal display (LCD). If manual data entry is required, the processing system also includes an input device such as one or more of an alphanumeric input unit such as a keyboard, a pointing control device such as a mouse, and so forth.

The memory includes machine-readable code segments (e.g. software or software code) including instructions for performing, when executed by the processing system, one of more of the methods described herein. The software may reside entirely in the memory, or may also reside, completely or at least partially, within the RAM and/or within the processor during execution thereof by the computer system. Thus, the memory and the processor also constitute a system comprising machine-readable code.

In alternative embodiments, the machine operates as a standalone device or may be connected, e.g., networked to other machines, in a networked deployment, the machine may operate in the capacity of a server or a client machine in server-client network environment, or as a peer machine in a peer-to-peer or distributed network environment. The machine may be, for example, a computer, a server, a cluster of servers, a cluster of computers, a web appliance, a distributed computing environment, a cloud computing environment, or any machine capable of executing a set of instructions (sequential or otherwise) that specify actions to be taken by that machine. The term "machine" may also be taken to include any collection of machines that individually or jointly execute a set (or multiple sets) of instructions to perform any one or more of the methodologies discussed herein.

The foregoing disclosure of the exemplary embodiments of the present invention has been presented for purposes of illustration and description. It is not intended to be exhaustive or to limit the invention to the precise forms disclosed. Many variations and modifications of the embodiments described herein will be apparent to one of ordinary skill in the art in light of the above disclosure. The scope of the invention is to be defined only by the claims appended hereto, and by their equivalents.

Further, in describing representative embodiments of the present invention, the specification may have presented the method and/or process of the present invention as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process of the present invention should not be limited to the performance of their steps in the order written, and one skilled in the art can readily appreciate that the sequences may be varied and still remain within the spirit and scope of the present invention.

What is claimed is:

1. A method comprising:
   providing a sensor for acquiring a biometric characteristic of a user of an electronic device;
   providing a microprocessor executing a user interface application relating to a user interface for the electronic device;
   providing a memory forming part of the electronic device for storing:
      the user interface application;
      at least one reference biometric characteristic of a plurality of reference biometric characteristics, each reference biometric characteristic relating to an authorised user of the electronic device;
      at least one contextual dashboard of a plurality of contextual dashboards, wherein each contextual dashboard relates to configurations for a predetermined set of software applications to be provided to a predetermined authorised user; and
      at least one user profile of a plurality of user profiles, each user profile associated with an authorised user of the electronic device and a predetermined portion of the plurality of contextual dashboards;
   determining whether an intended user of the electronic device is an authorised user based upon acquiring a biometric characteristic of the user acquired with the sensor and comparing the acquired biometric characteristic with the plurality of reference biometric characteristics stored within the memory of the electronic device; and
   upon determining the intended user is an authorised user displaying on the electronic device a contextual dashboard, the contextual dashboard selected in dependence upon the authorised user, a macro-context of the electronic device and a micro-context of the electronic device; wherein
   establishing the micro-context comprises automatically detecting the presence of additional individuals with the user in the immediate vicinity of the user by processing acquired biometric characteristics from the sensor employed in establishing the user as an authorised user to identify the presence of any other users than the authorised user; and
   the contextual dashboard displayed where the micro-context includes the presence of additional individuals is established either by applying at least one of predetermined limitations and predetermined settings with respect to a contextual dashboard that would have been presented to the authorised user without detecting the presence of additional individuals and closing the user interface application.

2. The method according to claim 1, wherein processing acquired biometric characteristics from the sensor comprises at least one of analyzing the remainder of an image acquired for facial recognition of the user and processing an audio signal from a microphone.

3. The method according to claim 1, wherein the micro-context is determined in dependence upon at least one associated device identity of a plurality of device identities, each associated device being in communication with the electronic device through at least one wireless interface of a plurality of wireless interfaces.

4. A method comprising:
providing a user interface application in execution upon a device comprising at least a memory and a microprocessor;
providing a plurality of contextual dashboards within the memory, each contextual dashboard relating to the identities and settings of a predetermined set of software applications;
providing a plurality of reference biometric characteristics, each reference biometric characteristic relating to an authorised user of the device;
establishing a first contextual dashboard upon a display in dependence upon the user interface application, an identity of a user of the device, a macro-context, and a micro-context;
detecting a change in at least one of the user identity, the macro-context and the micro-context;
dynamically determining whether to modify the first contextual dashboard to a second contextual dashboard where the detected change is with respect to at least one of the macro-context and the micro-context, the second contextual dashboard being determined in dependence upon the user interface application, the changed at least one of the macro-context and the micro-context and the unchanged at least one of the macro-context and the micro-context;
dynamically determining whether to modify the first contextual dashboard to a third contextual dashboard where the detected change is with respect to the user identity and the change is from one authorised user to another authorised user, the third contextual dashboard being determined in dependence upon at least the user interface application and the user identity of the another authorised user; and
dynamically disabling the user interface application where the detected change is with respect to the user identity and the change is from an authorised user to an unauthorised user; wherein
either establishing the micro-context employed in initially establishing the first context dashboard or detecting the change in the micro-context comprises automatically detecting the presence of additional individuals with the user in the immediate vicinity of the user by processing acquired biometric characteristics from a biometric sensor employed in establishing the user as an authorised user to identify the presence of any other users than the authorised user; and
modifying the first contextual dashboard to the second contextual dashboard where the detected change in the micro-context includes detecting the presence of additional individuals is either applying at least one of predetermined limitations and predetermined settings with respect to software applications that are accessible via the user interface application and closing the user interface application.

5. The method according to claim 4, wherein detecting a change in the user identity comprises employing a sensor providing a biometric characteristic of the user of the device.

6. The method according to claim 4, wherein closing the user interface application also comprises alerting the user.

7. The method according to claim 4, wherein the device automatically stores and analyses aspects of the user's use of the device together with information relating to macro-contexts and micro-contexts at the time of storing the aspects of the user's use of the device and prompts the user to the potential of creating a new contextual dashboard to improve their use of the device.

8. The method according to claim 4, wherein dynamically modifying comprises at least one of changing the contextual dashboard in a single event and changing aspects of the first contextual dashboard to provide the second contextual dashboard in a series of steps based upon activity with the applications within the first contextual dashboard.

9. The method according to claim 4, wherein processing acquired biometric characteristics from the sensor comprises at least one of analyzing the remainder of an image acquired for facial recognition of the user and processing an audio signal from a microphone.

10. A device comprising:
a sensor for acquiring a biometric characteristic of a user of an electronic device;
a microprocessor; and
a non-volatile, non-transitory memory for storing:
at least one reference biometric characteristic of a plurality of reference biometric characteristics, each reference biometric characteristic relating to an authorised user of the device;
at least one contextual dashboard of a plurality of contextual dashboards, wherein each contextual dashboard relates to configurations for a predetermined set of software applications to be provided to a predetermined authorised user; and
at least one user profile of a plurality of user profiles, each user profile associated with an authorised user of the electronic device and a predetermined portion of the plurality of contextual dashboards; and
the user interface application stored as executable instructions; wherein
the microprocessor executes the executable instructions of the user interface application for:
determining whether an intended user of the device is an authorised user based upon acquiring a biometric characteristic of the user acquired with the sensor and comparing the acquired biometric characteristic with the plurality of reference biometric characteristics stored within the memory of the electronic device; and
upon determining the intended user is an authorised user displaying on the electronic device a contextual dashboard, the contextual dashboard selected in dependence upon the authorised user, a macro-context of the electronic device and a micro-context of the electronic device; wherein
establishing the micro-context comprises automatically detecting the presence of additional individuals with the user in the immediate vicinity of the user by processing acquired biometric characteristics from the sensor employed in establishing the user as an authorised user to identify the presence of any other users than the authorised user; and the contextual dashboard displayed where the micro-context includes the presence of additional individuals is established either by applying at least one of predetermined limitations and predetermined settings with respect to a contextual dashboard that would have been presented to the authorised user without detecting the presence of additional individuals and closing the user interface application.

11. The device according to claim 10, wherein
the contextual dashboard relates to configurations for a predetermined set of software applications, said configurations including at least one of location, size, status, and permission rights.

12. The device according to claim 10, wherein
the micro-context is determined in dependence upon at least one associated device identity of a plurality of device identities, each associated device being in communication with the electronic device through at least one wireless interface of a plurality of wireless interfaces.

13. The device according to claim 10, wherein
the microprocessor further executes the executable instructions of the user interface application for:
detecting a change in at least one of the user identity, the macro-context and the micro-context; and
dynamically modifying the first contextual dashboard to a second contextual dashboard, the second contextual dashboard being determined in dependence upon the user interface application, the changed at least one of the user identity, the macro-context and the micro-context and the unchanged at least one of the user identity, the macro-context and the micro-context.

14. The device according to claim 13, wherein
detecting a change in the user identity comprises employing a sensor providing a biometric characteristic of the user of the device.

15. The device according to claim 13, wherein
closing the user interface application also comprises alerting the user.

16. The device according to claim 13, wherein
dynamically modifying comprises at least one of changing the contextual dashboard in a single event and changing aspects of the first contextual dashboard to provide the second contextual dashboard in a series of steps based upon activity with the applications within the first contextual dashboard.

17. The device according to claim 10, wherein
the device automatically stores and analyses aspects of the user's use of the device together with information relating to macro-contexts and micro-contexts at the time of storing the aspects of the user's use of the device and prompts the user to the potential of creating a new contextual dashboard to improve their use of the device.

18. The device according to claim 10, wherein
processing acquired biometric characteristics from the sensor comprises at least one of analyzing the remainder of an image acquired for facial recognition of the user and processing an audio signal from a microphone.

* * * * *